United States Patent
Morris et al.

(10) Patent No.: US 7,657,549 B2
(45) Date of Patent: Feb. 2, 2010

(54) METHOD AND APPARATUS FOR PROCESSING XML TAGGED DATA

(75) Inventors: Stuart David Morris, Vancouver (CA); Dimitrina Ivanova Stroumeva, Vancouver (CA); Kory Robert Markevich, Burnaby (CA)

(73) Assignee: ACL Services Ltd., Vancouver, British Columbia (CA)

( * ) Notice: Subject to any disclaimer, the term of this patent is extended or adjusted under 35 U.S.C. 154(b) by 102 days.

(21) Appl. No.: 11/177,916

(22) Filed: Jul. 7, 2005

(65) Prior Publication Data

US 2007/0011184 A1 Jan. 11, 2007

(51) Int. Cl.
G06F 17/30 (2006.01)

(52) U.S. Cl. ........................................ 707/101; 707/102
(58) Field of Classification Search .............. 707/103 R
See application file for complete search history.

(56) References Cited

U.S. PATENT DOCUMENTS

| | | | |
|---|---|---|---|
| 5,295,256 A | 3/1994 | Bapat | 395/500 |
| 5,937,401 A | 8/1999 | Hillegas | 707/2 |
| 6,704,744 B1 | 3/2004 | Williamson et al. | 707/103 |
| 6,732,102 B1 * | 5/2004 | Khandekar | 707/10 |
| 6,799,182 B2 * | 9/2004 | Bata | 707/101 |
| 6,832,219 B2 | 12/2004 | Lal | 707/3 |
| 7,096,422 B2 * | 8/2006 | Rothschiller et al. | 715/513 |
| 2001/0047372 A1 | 11/2001 | Gorelik et al. | 707/514 |
| 2002/0099715 A1 | 7/2002 | Jahnke et al. | 707/100 |
| 2003/0070144 A1 | 4/2003 | Schnelle et al. | 715/513 |
| 2003/0212664 A1 | 11/2003 | Breining et al. | 707/3 |
| 2004/0064466 A1 | 4/2004 | Manikutty et al. | 707/100 |
| 2004/0163041 A1 | 8/2004 | Engel | 715/509 |
| 2004/0172590 A1 * | 9/2004 | Rothschiller et al. | 715/503 |
| 2004/0172592 A1 * | 9/2004 | Collie et al. | 715/503 |
| 2005/0010896 A1 | 1/2005 | Meliksetian et al. | 717/106 |
| 2006/0184552 A1 * | 8/2006 | Meliksetian et al. | 707/101 |

OTHER PUBLICATIONS

Masatoshi Yoshikawa, Toshiyuki Amagasa, Takeyuki Shimura, and Shunsuke Uemura, XRel: A Path-Baed Approach to Storage and Retrieval of XML Documents Using Relational Databases, ACM Transactions on Internet Technology, vol. 1 No. 1 Aug. 2002, p. 110-141.*

Michael Kay, Saxon: Anatomy of an XSLT processor, Feb. 1, 2001, http://www.ibm.com/developerworks/xml/library/x-xslt2/.*

Juliana Freire, Jayant R. Haritsa, Maya Ramanath, Prasan Roy, Jerome Simeon, StatiX: Making XML Count, ACM SIGMOD Jun. 4-6, 2002, p. 181-191.*

* cited by examiner

*Primary Examiner*—Neveen Abel Jalil
*Assistant Examiner*—Vei-Chung Liang
(74) *Attorney, Agent, or Firm*—Nixon Peabody LLP

(57) ABSTRACT

A method of converting an XML file containing elements to a table, each element having an XPath, in which row-terminating conditions a column data sources are determined; a scope for each element is determined; one of the elements is tested to determine if the element matches a column data source, and if it does the element is stored in a table cache and the columns are updated. The tested element is then stored in a prototype row; and when the method exits the tested element, a depth is passed to the table cache; then if the tested element matches one of the row-terminating conditions, matches a row-terminating condition, and is in the prototype row, then the prototype row is written to the table cache; then if the scope of one of the column data source matches the tested element, a column is erased in the prototype row.

4 Claims, 36 Drawing Sheets

XML Structure, with data sources marked as black (other elements in XML structure that are not data sources are ignored for this demonstration)

Fig. 24

XML Import

The Wizard has identified the field properties. Use this screen to modify the Wizard's recommendations. Click on the column heading to select a field ☐ Ignore this field Name: name
Column title:

Type: ASCII Text
Value: Bill Clinton
Date Format:

| | name | client_id | transaction_id | transaction type | amount | transfer from |
|---|---|---|---|---|---|---|
| 1 | Bill Clinton | 354622 | 274324 | Debit | 65.75 | |
| 2 | Bill Clinton | 354622 | 274325 | TransferOut | 34.56 | 777888999 |
| 3 | Bill Clinton | 354622 | 274326 | Deposit | 500.00 | |
| 4 | Bill Clinton | 354622 | 5749302 | TransferIn | 34.56 | |
| 5 | Al Gore | 6367327 | 6435378 | Debit | 85.29 | |
| 6 | Al Gore | 6367327 | 6435345 | Debit | 132.76 | |
| 7 | Al Gore | 6367327 | 6647484 | Debit | 53.12 | |
| 8 | Ronald Reagan | 2105 | | | | |
| 9 | Jimmy Carter | 77 | | | | |
| 10 | | | | | | |
| 12 | | | | | | |
| 13 | | | | | | |
| 14 | | | | | | |
| 15 | | | | | | |
| 16 | | | | | | |

[<< Back] [Next >>] [Finish] [Cancel] [Help]

Fig. 27

Import Command

Example

```
IMPORT XML TO xmlTestAudit "xmlTestAudit.fil" FROM "C:\AATestXMLImportVAudit02.xml"
FIELD "JournalID" N AT 1 DEC 0 WID 2 PIC "" AS "" RULE "/auditfile/transactions/journal/journalID/text()"
FIELD "JournalDescription" C AT 3 DEC 0 WID 9 PIC "" AS "" RULE "/auditfile/transactions/journal/transaction/description/text()"
FIELD "TransactionID" N AT 12 DEC 0 WID 7 PIC "" AS "" RULE "/auditfile/transactions/journal/transaction/transactionID/text()"
FIELD "TransactionDescription" C AT 19 DEC 0 WID 43 PIC "" AS "" RULE "/auditfile/transactions/journal/transaction/description/text()"
FIELD "TransactionDate" D AT 62 DEC 0 WID 10 PIC "YYYY-MM-DD" AS "" RULE "/auditfile/transactions/journal/transaction/transactionDate/text()"
FIELD "LineItemID" N AT 72 DEC 0 WID 4 PIC "" AS "" RULE "/auditfile/transactions/journal/transaction/line/recordID/text()"
FIELD "Account" N AT 76 DEC 0 WID 4 PIC "" AS "" RULE "/auditfile/transactions/journal/transaction/line/accountID/text()"
FIELD "EffectiveDate" D AT 80 DEC 0 WID 10 PIC "YYYY-MM-DD" AS "" RULE "/auditfile/transactions/journal/transaction/line/effectiveDate/text()"
FIELD "ItemDesc" C AT 90 DEC 0 WID 51 PIC "" AS "" RULE "/auditfile/transactions/journal/transaction/line/description/text()"
FIELD "CreditAmount" N AT 141 DEC 2 WID 8 PIC "" AS "" RULE "/auditfile/transactions/journal/transaction/line/creditAmount/text()"
```

Structure

```
<import command> ::= IMPORT XML TO <ACL table name> "<Stored ACL source file>" FROM "<XML source file>"
FIELD "<Column Name>" <column type> AT 1 DEC 0 WID 2 PIC "" AS "" RULE "/auditfile/transactions/journal/journalID/text()"
FIELD "JournalDescription" C AT 3 DEC 0 WID 9 PIC "" AS "" RULE "/auditfile/transactions/journal/transaction/description/text()"
FIELD "TransactionID" N AT 12 DEC 0 WID 7 PIC "" AS "" RULE "/auditfile/transactions/journal/transaction/transactionID/text()"
FIELD "TransactionDescription" C AT 19 DEC 0 WID 43 PIC "" AS "" RULE "/auditfile/transactions/journal/transaction/description/text()"
FIELD "TransactionDate" D AT 62 DEC 0 WID 10 PIC "YYYY-MM-DD" AS "" RULE "/auditfile/transactions/journal/transaction/transactionDate/text()"
FIELD "LineItemID" N AT 72 DEC 0 WID 4 PIC "" AS "" RULE "/auditfile/transactions/journal/transaction/line/recordID/text()"
FIELD "Account" N AT 76 DEC 0 WID 4 PIC "" AS "" RULE "/auditfile/transactions/journal/transaction/line/accountID/text()"
FIELD "EffectiveDate" D AT 80 DEC 0 WID 10 PIC "YYYY-MM-DD" AS "" RULE "/auditfile/transactions/journal/transaction/line/effectiveDate/text()"
FIELD "ItemDesc" C AT 90 DEC 0 WID 51 PIC "" AS "" RULE "/auditfile/transactions/journal/transaction/line/description/text()"
FIELD "CreditAmount" N AT 141 DEC 2 WID 8 PIC "" AS "" RULE "/auditfile/transactions/journal/transaction/line/creditAmount/text()"
```

Fig. 29

XML Structure Table (XST)

| Node | # in File | # with data | Max frequency under parent |
|---|---|---|---|
| /personnel | 1 | 0 | 1 |
| /personnel/person | 2 | 0 | 2 |
| /personnel/person/name | 2 | 2 | 1 |
| /personnel/person/title | 2 | 2 | 1 |
| /personnel/person/team | 2 | 0 | 1 |
| /personnel/person/team/person | 4 | 0 | 2 |
| /personnel/person/team/person/name | 4 | 4 | 1 |
| /personnel/person/team/person/title | 4 | 4 | 1 |
| /personnel/person/team/location | 2 | 2 | 1 |
| /personnel/person/location | 2 | 2 | 1 |

Fig. 30

Column Data Source Table (CDST)

| Column Name | Data Source | Row Termination Rule |
|---|---|---|
| Name | /personnel/person/name | /personnel/person |
|  | /personnel/person/team/person/name | /personnel/person/team/person |
| Location | /personnel/person/location | /personnel/person |
|  | /personnel/person/team/location | /personnel/person/team/person |

Fig. 31

Row Termination Rule Base (RTRB)

| Row Termination Rule |
|---|
| /personnel/person |
| /personnel/person/team/person |

Fig. 32

Prototype Row

| Name | Location |
|---|---|
| John Dunning | Sanderhurst Building |

Fig. 33

Table Cache

| Name | Location |
|---|---|
| Janet Smith | |
| Tim Layne | |

Fig. 34

Table Cache Reference Table

| Name | | Location | | Row |
|---|---|---|---|---|
| A | 2 | | | A |
| B | 4 | | | B |

Fig. 35

| Name | Location |
|---|---|
| Janet Smith | Administration Building |
| Tim Layne | Sanderhurst Building |
| John Dunning | Sanderhurst Building |
| Frank Tannenbaum | Sanderhurst Building |
| Sarah Dunning | Sanderhurst Building |
| Kevin Harper | Sanderhurst Building |

Fig. 36

```xml
<?xml version="1.0" encoding="utf-8" ?>
<personnel>
  <person>
    <name>Janet Smith</name>
    <title>Development Manager</title>
    <team>
      <person>
        <name>Tim Layne</name>
        <title>Team Lead</title>
      </person>
      <person>
        <name>John Dunning</name>
        <title>Developer</title>
      </person>
      <location>Sanderhurst Building</location>
    </team>
    <location>Administration Building</location>
  </person>
  <person>
    <name>Frank Tannenbaum</name>
    <title>Development Manager</title>
    <team>
      <person>
        <name>Sarah Dunning</name>
        <title>Developer</title>
      </person>
      <person>
        <name>Kevin Harper</name>
        <title>Team Lead</title>
      </person>
      <location>Sanderhurst Building</location>
    </team>
    <location>Sanderhurst Building</location>
  </person>
</personnel>
```

Example 1 - Bank

The following short XML file represents client and employee accounts and transactions at a bank.

```
<?xml version="1.0" ?>
<bank>
  <client id="354622">
    <name>Bill Clinton</name>
    <detail>City: Nashua, NH</detail>
    <detail>Phone: 555-555-8975</detail>
    <account>
      <type>Checking</type>
      <accountNumber>111222333</accountNumber>
      <transaction id="">
        <type>Debit</type>
        <amount>65.75</amount>
      </transaction>
      <transaction id="274325">
        <type>TransferOut</type>
        <amount>34.56</amount>
        <transfer_to>777888999</transfer_to>
      </transaction>
      <transaction id="274326">
        <type>Deposit</type>
        <amount>500.00</amount>
      </transaction>
    </account>
    <account>
      <type>Savings</type>
      <accountNumber>777888999</accountNumber>
      <transaction id="5749302">
        <type>TransferIn</type>
        <amount>34.56</amount>
        <transfer_from>111222333</transfer_from>
      </transaction>
    </account>
  </client>
  <client id="6367327">
    <name>Al Gore</name>
    <detail>City: Washington, DC</detail>
    <detail>Phone: 555-555-4256</detail>
    <account>
      <type>Savings</type>
      <accountNumber>444777888</accountNumber>
  <transaction id="6435378">
```

Fig. 42

```xml
      <type>Debit</type>
         <amount>85.29</amount>
      </transaction>
      <transaction id="6435345">
         <type>Debit</type>
         <amount>132.76</amount>
      </transaction>
      <transaction id="6647484">
         <type>Debit</type>
         <amount>53.12</amount>
      </transaction>
    </account>
  </client>
  <employee>
    <empID>2105</empID>
    <name>Ronald Reagan</name>
    <detail>City: Nashua, NH</detail>
    <detail>Phone: 555-555-1245</detail>
    <salary>60000</salary>
    <account>
      <type>Checking</type>
      <accountNumber>666333888</accountNumber>
      <transaction id="6436543">
         <type>Direct Deposit</type>
         <amount>1778.54</amount>
      </transaction>
      <transaction id="6435375">
         <type>Debit</type>
         <amount>750.00</amount>
      </transaction>
      <transaction id="6647465">
         <type>Debit</type>
         <amount>3.00</amount>
      </transaction>
    </account>
  </employee>
  <employee>
    <empID>77</empID>
    <name>Jimmy Carter</name>
    <detail>City: Denver, CO</detail>
    <detail>Phone: 555-555-1235</detail>
    <salary>250000</salary>
    <account>
      <type>Checking</type>
      <accountNumber>777222444</accountNumber>
      <transaction id="6435675">
```

Fig. 42 *(cont'd.)*

```xml
<type>Debit</type>
      <amount>102.65</amount>
    </transaction>
    <transaction id="6436542">
      <type>Direct Deposit</type>
      <amount>2200.00</amount>
    </transaction>
    <transaction id="876443">
      <type>Service Charge</type>
      <amount>1.25</amount>
    </transaction>
   </account>
   <account>
     <type>RRSP</type>
     <accountNumber>111999555</accountNumber>
     <transaction id="643653">
        <type>Direct Deposit</type>
        <amount>300.00</amount>
     </transaction>
   </account>
  </employee>
  <branchID>78963</branchID>
</bank>
```

Fig. 42 *(cont'd.)*

METHOD AND APPARATUS FOR PROCESSING XML TAGGED DATA

BACKGROUND OF THE INVENTION

1. Field of the Invention

This invention relates to converting data into a tabular structure, and more particularly to formatting XML data into tabular structures 2. Background of the Invention There are a number of difficulties in converting a rich hierarchical data format such as XML into a tabular structure. XML data contains several inherent types of information that are not directly convertible into tables, and the hierarchy, order, and type of each tabular element may be difficult to convert to a table.

Related prior art includes U.S. Pat. No. 6,704,744 to Williamson et al. which discloses a method and apparatus for mapping objects to multiple tables of a database.

Other art includes U.S. Pat. No. 6,799,182 to Bata which discloses a system and method for data source flattening; U.S. Pat. No. 6,832,219 to Lal which discloses a method and system for storing and querying of markup based documents in a relational database; U.S. Pat. No. 5,937,401 to Hillegas which discloses a database system with improved methods for filtering duplicates from a tuple stream; U.S. Pat. No. 5,295,256 to Bapat which discloses an automatic storage of persistent objects in a relational schema; U.S. Patent Application Publication No. 2003/0070144 to Schnelle et al. which discloses a method, an apparatus and a computer program product for converting an XML encoded dataset into a minimal set of SQL tables; U.S. Patent Application Publication No. 2001/0047372 to Gorelik et al. which discloses, in a data processing system, hierarchical documents or hierarchical messages that are mapped to a Nested Relational Data Model to allow for transformation and manipulation using declarative statements; U.S. Patent Application Publication No. 2005/0010896 to Meliksetian et al., which discloses a program product, system and method for transforming data between an XML representation and a relational database system wherein a mapping description is created in a mark-up language such as XML and XSL; U.S. Patent Application Publication No. 2004/0163041 to Engel, which discloses textual elements and unambiguous locations paths corresponding to textual elements and/or their ancestors that are extracted from a tree-structured document such as an XML document and stored in relational database structures; U.S. Patent Application Publication No. 2004/0064466 to Manikutty et al., which discloses techniques for executing database commands include receiving a database command that includes an XML component operation that operates on an XML construct that is based on a first set of one or more relational database constructs; U.S. Patent Application Publication No. 2003/0212664 Breining et al., which discloses an XML wrapper which queries an XML document in an on-the-fly manner so that only parent nodes in the document that satisfy the query are extracted and then unnested; and U.S. Patent Application Publication No. 2002/0099715 Jahnke et al., which discloses a method for importing data from an XML document containing a plurality of elements and a plurality of attributes into a relational database.

The prior art includes several ways of converting XML data into a tabular structure, but these tend to lack certain features. For example in many of the conversion processes, the conversion holds the entire document in memory at once, requiring a significant memory. In others, single columns cannot have multiple data sources, which doesn't allow for the intelligent import of similar yet differently-named and structured XML structures. In yet others, the specified data sources cannot be specific instances of XML elements, and in yet others the data sources cannot provide the name of the XML data source, as well as providing the data.

BRIEF SUMMARY OF THE INVENTION

While there are several ways of converting XML into a tabular format, there are certain beneficial features of the present invention:

(a) unlike XML conversion languages like XSLT, the present method of conversion does not need to hold the entire document in memory at once, as processing is done during a serial reading of the XML file;

(b) single columns can have multiple data sources, allowing for intelligent import of similar yet differently-named and structured XML structures;

(c) specified data sources may be specific instances of XML elements; and (d) data sources can be the name of the XML data source, as well as being the data.

A method of converting an XML file to a table having rows and columns, the XML file having a plurality of elements, each element having an XPath, is provided, including: (a) determining row-terminating conditions using a structure of the XML file and a plurality of column data sources; (b) determining a scope for each of said elements in the XML file; (c) testing one of said elements in the XML file to determine if said tested element matches one of said column data sources, and if said tested element matches one of said column data sources, storing said element in a table cache, updating the columns that are within said scope of said tested element, and storing said tested element in a prototype row; and when exiting said tested element, passing a depth associated with said tested element to said table cache; (d) determining if said tested element matches one of said row-terminating conditions, and if said tested element matches a row-terminating condition, and the said tested element is in said prototype row, then writing said prototype row to said table cache; (e) determining if the scope of one of said column data source matches the tested element, and if so, erasing a column in said prototype row corresponding to said tested element; (f) repeating steps (c) through (e) until each element of the XML file has been tested; and (g) copying the prototype row to the table cache. Steps (c) through (e) are completed once for each of said elements.

Step (a) may include: (a.1) for each of said elements, determining a number of occurrences of said element in the XML file, a number of occurrences of said element containing data, and a maximum number of occurrences of said element under a parent of said element; and (a.2) for each of said elements, if said element contains data, adding said element to a structure description. The column data sources may be stored in a column data source table.

Step (a) may comprise: (a.3) for each element in said structure description, if said element contains data and is a first element under said parent of said element, adding said element to a table like structure list; (a.4) determining a rule node by: (i) for each column data source in said column data source table, determining if a parent of a selected node linked to said column data source is NULL, and if said parent is NULL, selecting instead a following node; (ii) unmarking said selected node; and (iii) if said parent of said selected node is unmarked, then marking said parent and replacing said selected node with said parent in said column data source table; and if said parent is marked, removing a link between said selected node and said column data source.

The row-terminating conditions may be determined by: (a.5) examining each marked node in said structure description and copying said examined node to a row termination rule base; and (a.6) for each column data source in said column data source table, determining matching nodes in said row termination rule base, determining a maximum number of matching nodes and linking said column data source to a matching node having a largest maximum number of matches and updating said column data source table.

Step (b) may comprise: (b.1) determining a data source scope table by, for each column data source in said column data source table, obtaining a row termination rule from said row termination rule base; (b.2) determining a scope for said column data source by determining an intersection of said column data source and said row termination rule; and (b.3) adding said scope to said data source scope table.

A method of determining the row terminating conditions in an XML file containing a plurality of elements is provided, comprising: (a) for each of said elements, determining a number of occurrences of said element in the file, a number of occurrences of said element containing data, and a maximum number of occurrences of said element under a parent of said element; (b) for each of said elements, if said element contains data, adding said element to a structure description; (c) determining a plurality of column data sources and storing each of said column data sources in a column data source table; (d) for each element in said structure description, if said element in said structure description contains data and is a first element under a parent of said element in said structure description, adding said element in said structure description to a table like structure list; (e) determining a rule node by: (i) for each column data source in said column data source table, determining if a parent of a selected node linked to said column data source is NULL, and if said parent is NULL, selecting instead a following node; (ii) unmarking said selected node; and (iii) if said parent of said selected node is unmarked, then marking said parent of said selected node and replacing said selected node with said parent of said selected node in said column data source table; and if said parent of said selected node is marked, removing a link between said selected node and said column data source; and (f) examining each marked node in said structure description and copying said node to a row termination rule base. The method may include determining a scope for each of said elements in the XML file.

Step (g) may comprise: (g.1) determining a data source scope table by, for each data column source in said column data source table, obtaining a row termination rule from said row termination rule base; (g.2) determining a scope for said data column source by determining an intersection of said data column source and said row termination rule; and (g.3) adding said scope to said data source scope table.

The method may further comprising: (h) testing one of said elements in the XML file to determine if said tested element matches one of said column data sources, and if said tested element matches one of said column data sources, storing said tested element in a table cache, updating columns in said table cache that are within said scope of said tested element, and storing said tested element in a prototype row; and when exiting said tested element, passing a depth associated with said tested element to said table cache; (i) determining if said tested element matches one of said row-terminating conditions, and if said tested element matches a row-terminating condition, and said element is in said prototype row, then writing said prototype row to said table cache; (j) determining if the scope of one of said column data source matches the tested element, and if so, erasing a column in said prototype row corresponding to said tested element; (k) repeating steps (h) through (j) until each element of the XML file has been tested; and (l) copying said prototype row to said table cache. Steps (h) through (j) may be completed once for each of said elements in the XML file.

The methods may be expressed in computer executable software code transmitted as an information signal or may be stored in a computer readable medium carrying one or more sequences of instructions for allowing a computer to carry out the method.

BRIEF DESCRIPTION OF THE DRAWINGS

FIG. 24 is a preferred embodiment of a screen shot by which the user by which a user selects tabular structures;

FIG. 27 is a preferred embodiment of a screen shot by which the user by which a user can modify column type properties;

FIG. 29 is an example of the Import Command structure and contents;

FIG. 30 is an example of an XML structure table according to the invention;

FIG. 31 is an example of a column data source table according to the invention;

FIG. 32 is an example of a row termination rule base according to the invention;

FIG. 33 is an example of a prototype row according to the invention;

FIG. 34 is an example of a table cache according to the invention;

FIG. 35 is an example of a table cache reference table according to the invention;

FIG. 36 is an example of a completed table at the end of the method according to the invention;

FIG. 37 is sample of XML code;

FIG. 40 is an alternative representation of a display screen by which a user selects the preferred table structure;

FIG. 42 is a further example of an XML file.

DETAILED DESCRIPTION OF THE INVENTION

Introduction

Figure 1:
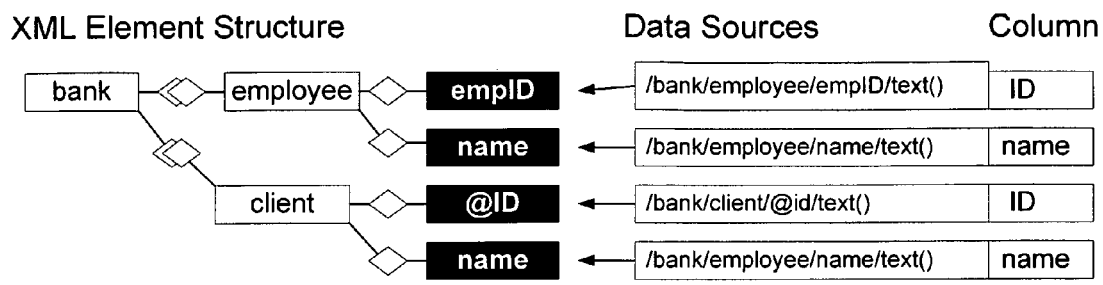
FIG. 1 is a tree diagram showing an XML structure according to the invention.

A rich hierarchical data format such as XML may be difficult to convert into a tabular structure for display or further processing. XML contains several inherent types of information that are not directly convertible to tables, for example, the hierarchy, order, and type of each element in an XML file may be difficult to convert to tables in certain circumstances. The following method provides a means of overcoming these difficulties to efficiently convert XML files into tabular format.

In the following document the following terms will be given the meanings below:

"data source" means an XPath string containing the location of a data source for a column in the table;

"data source scope" (or "scope") means the context of the position within the traversal of an XML file in which a column's data is valid;

"prototype row" means a row structure in memory that accumulates data as it is encountered during traversal of the XML document until a row terminating condition is encountered;

"row-terminating condition" (or "row-terminating rule") means a pattern used to determine when a row should be written and the prototype row cleared. When leaving such an element during the traversal of the XML document, the data held in the prototype row is flushed to the table cache;

"table" means a two-dimensional array of data, arranged by rows and columns; and "table cache" means a stored set of references to items that have been written out to rows, but which still may be modified as the XML file is traversed. As the column data sources referred to in the cache leave the scope, references to them are removed.

Given the structure of an XML file, an example of which is shown in FIG. 30, a list of column names and the source of the their data expressed as strings that match the structure of the XML document, the method according to the invention can convert the desired data to a tabular format, an example of which is shown in FIG. 36, in a single serial pass through the XML file without requiring a high memory resource overhead.

In order to perform the conversion, the algorithm needs a valid XML file; the structure of the XML file, particularly the relation of child nodes to parent nodes (many-to-one or one-to-one); and a list of column data sources an example of which is shown in FIG. 31, associated with columnar names.

The method according to the invention is preferably carried out using a conventional computer, having a processing unit, a memory, input means and output means. The computer may be part of a network of other computers and one or more of the functions according to the invention may be carried out on different computers.

The method according to the invention may be implemented as computer executable software code transmitted as an information signal. Furthermore, the method according to the invention may be stored in a computer readable medium carrying one or more sequences of instructions for allowing a computer to carry out the method.

Algorithm Description

In brief, before the conversion of the XML file to a table, the computer determines the row-terminating patterns in order to determine when to export a row to the table. To do so, the computer uses an algorithm that uses the structure of the XML file along with the column data sources to determine the row-terminating conditions, an example of which is shown in FIG. 32.

Once the row-terminating conditions have been found, the scope of the data elements is determined.

Then the XML document is traversed, element by element. As each element is encountered, it is tested to see if it is one of the column data sources. If it is, then the element's data is first sent to the table cache in order to update any columns that are still "in scope", and is then put into the prototype row, an example of which is shown in FIG. 33 (note that this action can trigger the row prototype being written to the table cache).

When entering an element, the depth of the XML hierarchy is first passed to the table cache, an example of which is shown in FIG. 34, which allows references to pending items in the cache to be cleared that might be backfilled. Then the current element's location is compared to the list of row-terminating conditions. If one is matched, and there is new data in the prototype row, then the prototype row is written to the table cache.

After checking for row-terminating conditions, each column data source's scope is checked to see if it matches the XML element being left. If there is a match, then the corresponding column in the prototype row is erased.

This pattern continues until the entire XML document has been traversed, at which point the prototype row is flushed to the table cache if there is any data left in it.

Example #1

To illustrate the method according to the invention, a simple example is provided using XML File #1.

```
XML File #1

<planet>
    <name>Earth</name>
    <continent name="North America">
        <nation>Canada</nation>
        <nation>USA</nation>
    </continent>
    <continent name="Asia">
        <nation>Japan</nation>
        <nation>Singapore</nation>
    </continent>
</planet>
```

The final result of processing XML File #1 is illustrated in Table #1.

TABLE 1

| Planet | Continent | Nation |
|---|---|---|
| Earth | North America | Canada |
| Earth | North America | USA |
| Earth | Asia | Japan |
| Earth | Asia | Singapore |

The column data sources of XML File #1 are specified in Table #2.

TABLE 2

| Column | Data Source |
|---|---|
| Planet | /planet/name/text( ) |
| Continent | /planet/continent/@name/text( ) |
| Nation | /planet/continent/nation/text( ) |

A single row-terminating condition is determined, /planet/continent/nation, and the scopes for the column data sources determined as shown in Table 3.

TABLE 3

| Column | Data Source | Scope |
|---|---|---|
| Planet | /planet/name/text( ) | /planet |
| Continent | /planet/continent/@name/text( ) | /planet/continent |
| Nation | /planet/continent/nation/text( ) | /planet/continent/nation |

When traversing the XML file, each element is examined when encountered in the context of its position in the XML hierarchy and the appropriate action taken. The order of events is shown in Table 4 as elements are added to the prototype row and the table cache.

TABLE 4

| Path encountered | Action taken | Prototype Row | | | Written to Table Cache | | |
|---|---|---|---|---|---|---|---|
| | | Planet | Continent | Nation | Planet | Continent | Nation |
| In /planet | none | | | | | | |
| In /planet/name | Add to column | Earth | | | | | |
| In /planet/continent | Add attribute to column | Earth | North America | | | | |
| In /planet/continent/nation | Add to column | Earth | North America | Canada | | | |
| Out /planet/continent/nation | Write to cache | Earth | North America | Canada | Earth | North America | Canada |
| | Erase nation | Earth | North America | | | | |
| In /planet/continent/nation | Add to column | Earth | North America | USA | | | |
| Out /planet/continent/nation | Write to cache | Earth | North America | USA | Earth | North America | USA |
| | Erase nation | Earth | North America | | | | |
| Out /planet/continent | Erase continent | Earth | | | | | |
| In /planet/continent | Add attribute to column | Earth | Asia | | | | |
| In /planet/continent/nation | Add to column | Earth | Asia | Japan | | | |
| Out /planet/continent/nation | Write to cache | Earth | Asia | Japan | Earth | Asia | Japan |
| | Erase nation | Earth | Asia | | | | |
| In /planet/continent/nation | Add to column | Earth | Asia | Singapore | | | |
| Out /planet/continent/nation | Write to cache | Earth | Asia | Singapore | Earth | Asia | Singapore |
| | Erase nation | Earth | Asia | | | | |

TABLE 4-continued

| Path encountered | Action taken | Prototype Row | | | Written to Table Cache | | |
|---|---|---|---|---|---|---|---|
| | | Planet | Continent | Nation | Planet | Continent | Nation |
| Out /planet/continent | Erase continent | Earth | | | | | |
| Out /planet | Erase planet | | | | | | |
| End of processing | | | | | | | |

Note that if the planet name had come at the end of the file instead of at the beginning, the output would have remained the same because the table cache would remember the position of all "planet" columns, and backfilled it when it was encountered.

In Detail

The method according to the invention will now be discussed in detail with reference to the Figures and to XML File #2 as shown in FIG. 37. The method by which XML File #2 is converted to a tabular format will be shown in detail.

Figure 5:
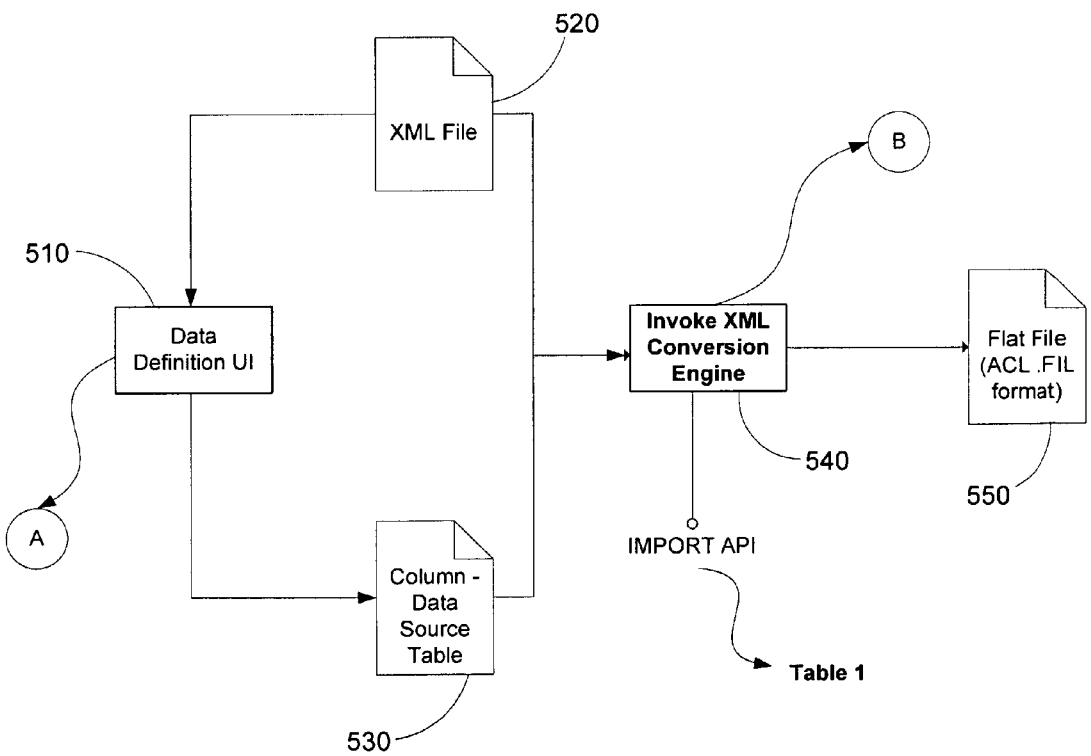
FIG. 5 is a block diagram showing a system according to the invention.

An overview of the method and system according to the invention is seen in FIG. 5. The system requires as input an XML file 520, data definition 510 as obtained from the user, and a column-data source table 530. From this, the XML conversion engine 540 is invoked, and the import command may be used through the Import API as seen in FIG. 29. Finally, output 550 is generated.

Preconversion Steps

Figure 6:
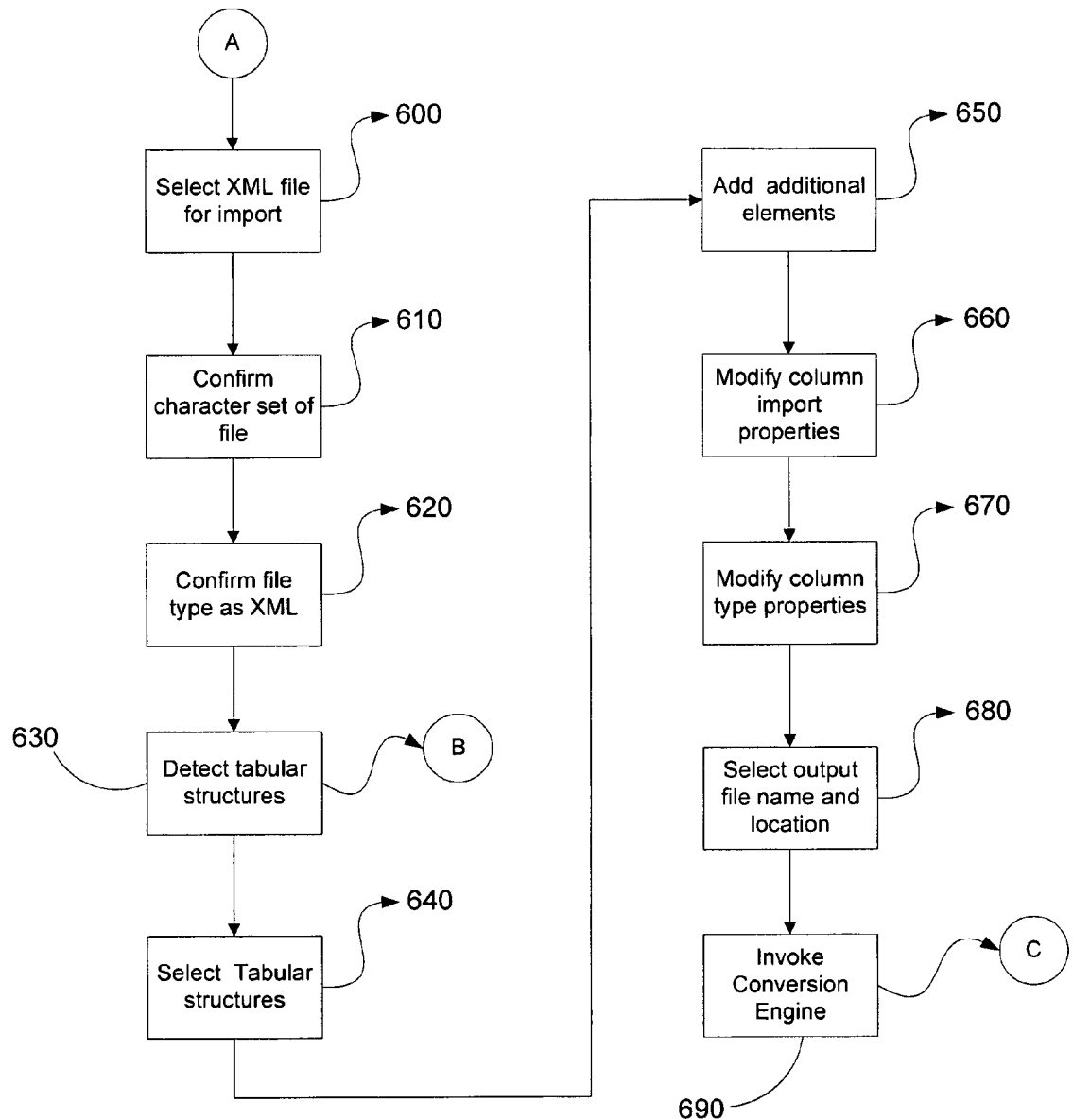
FIG. 6 is a flow chart of a preferred embodiment of the method according to the invention.
Figure 21:
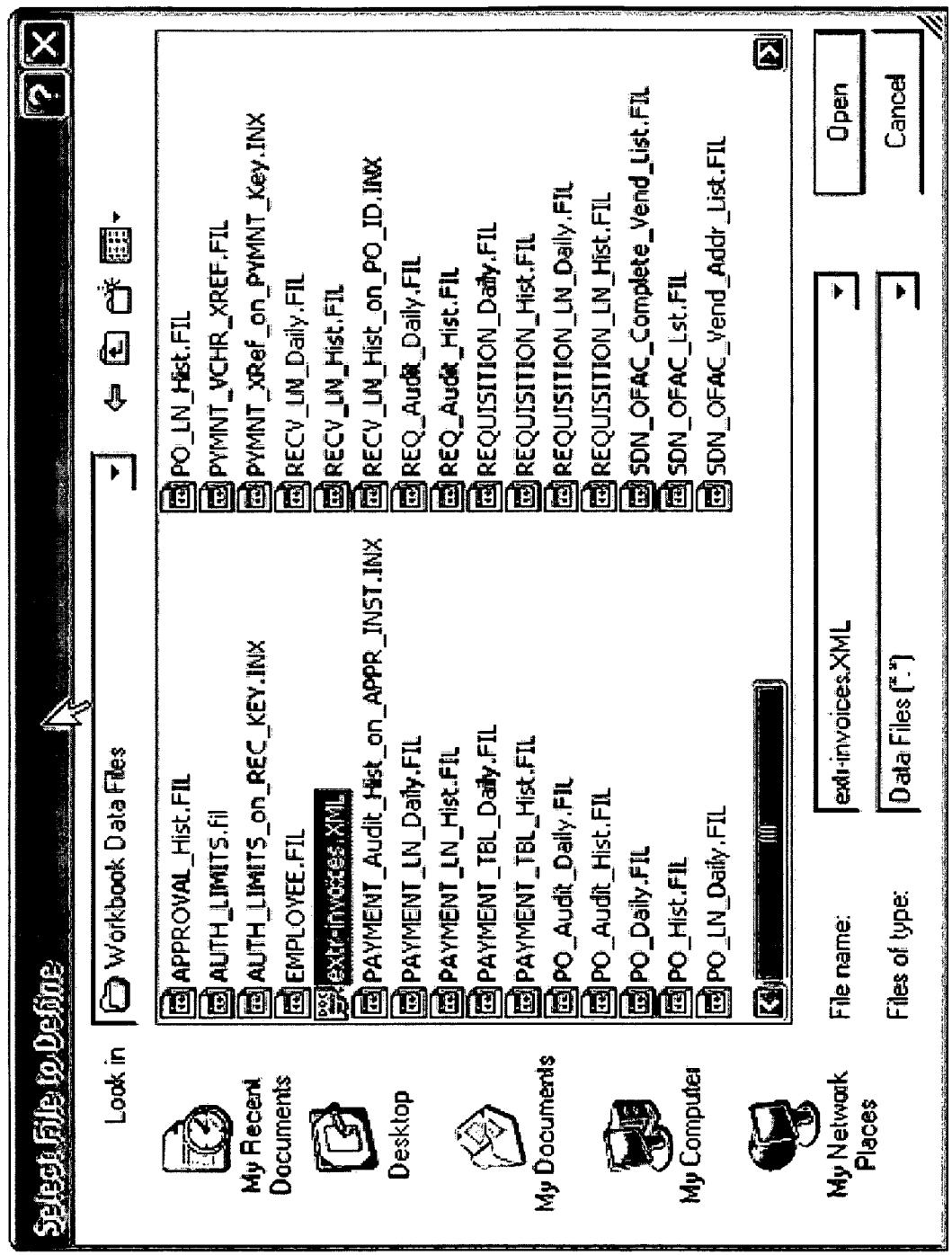
FIG. 21 is a preferred embodiment of a screen shot by which a user selects an XML file for import.

In a preferred embodiment of the invention a computer obtains the needed information from a user (either an individual or software). This information may be obtained using a software "wizard" as seen in FIGS. 21 through 28. More particularly, as seen in FIG. 6, at step 600, the user begins by selecting an XML file for import into a tabular structure. As seen in FIG. 21, in a preferred embodiment, a user selects the XML file by "browsing" their files in the standard operating system format.

Figure 22:
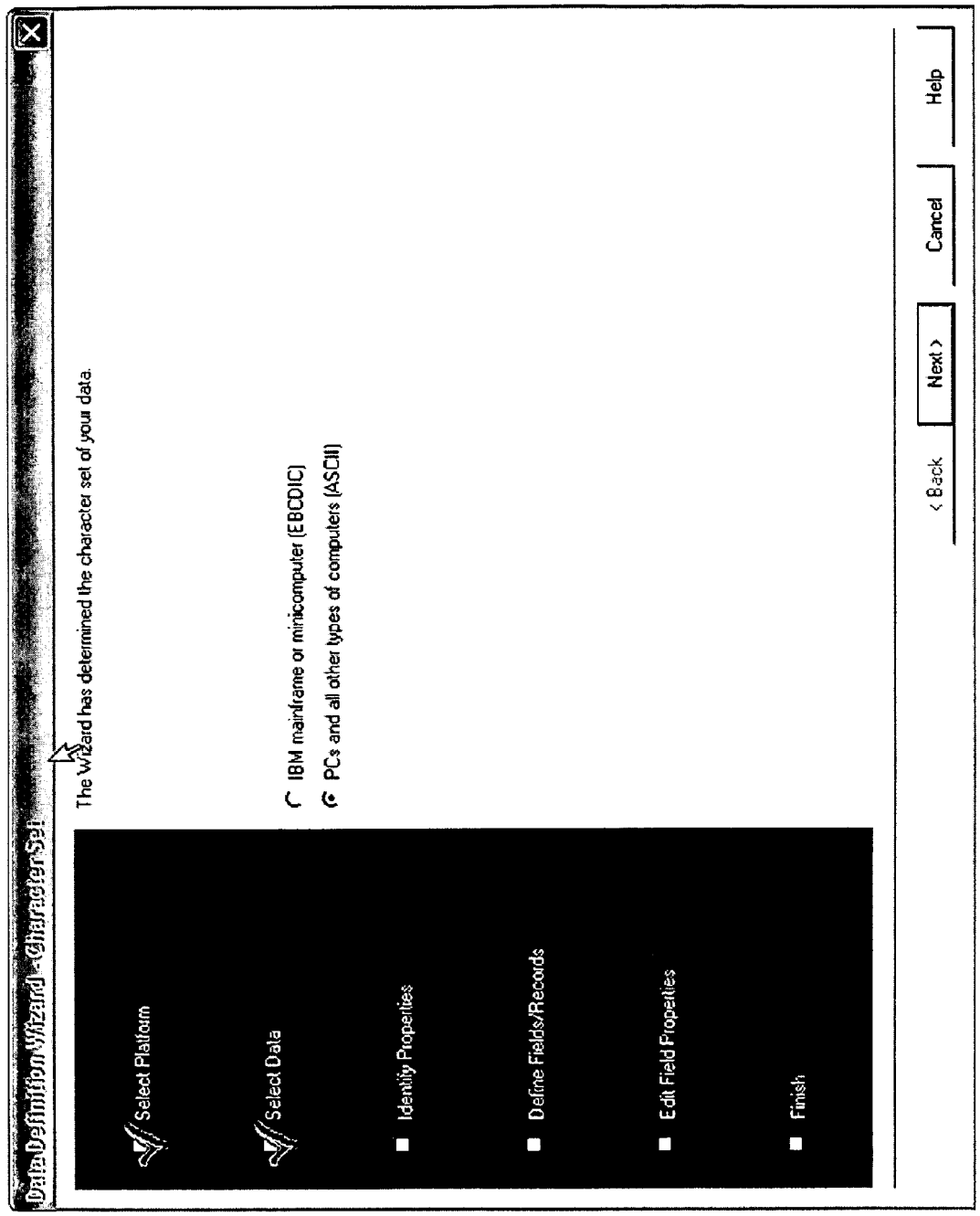
FIG. 22 is a preferred embodiment of a screen shot by which a user confirms the character set of the selected XML file.

In step 610, the user is asked to confirm the character set of the selected file. As seen in FIG. 22, in a preferred embodiment, the user can select either an IBM mainframe or microcomputer, in which case the EBCDIC is used, or PC and other types of computers in which case the ASCII character set is used.

Figure 23:
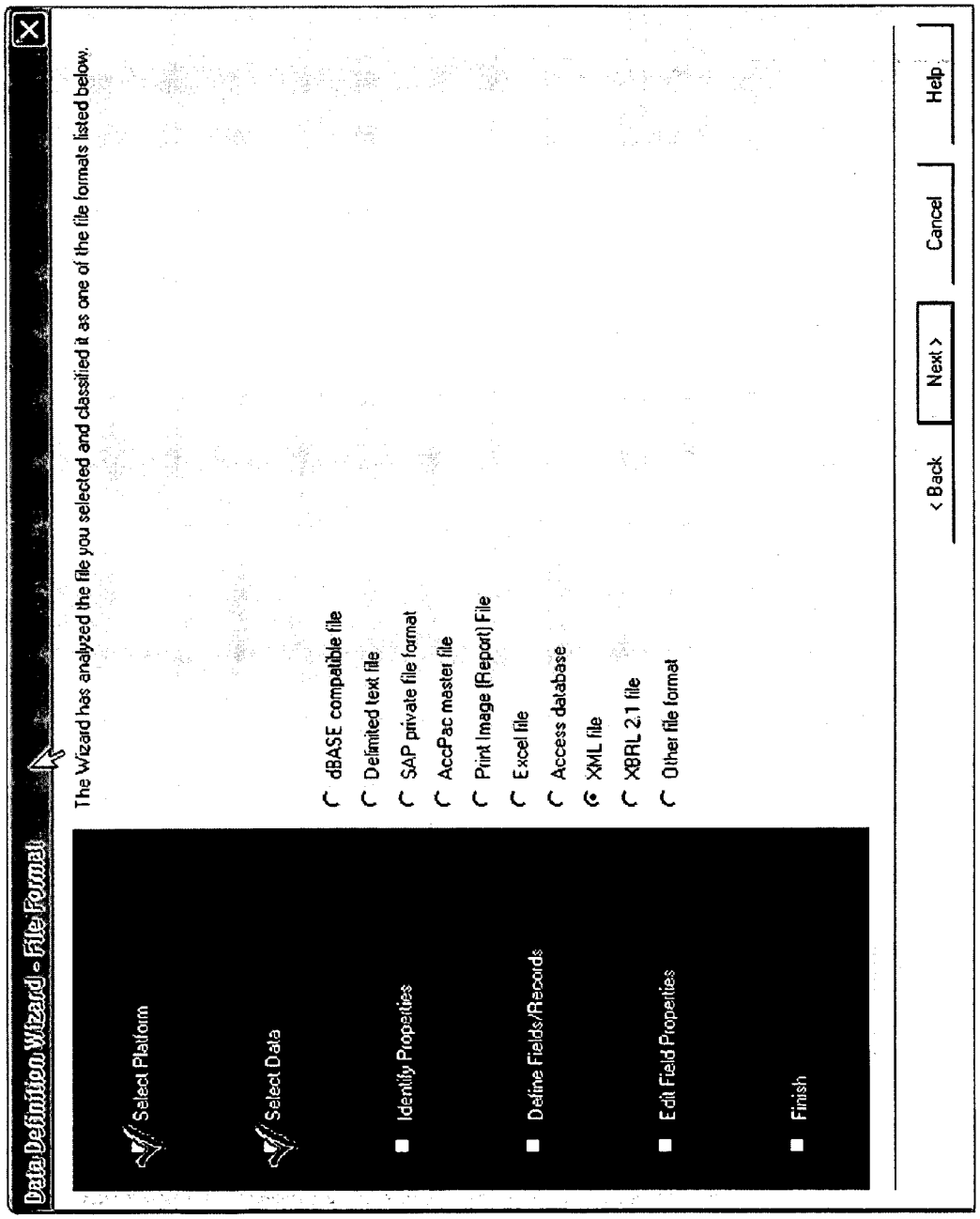
FIG. 23 is a preferred embodiment of a screen shot by which the user by which a user confirms the type of file as XML.

In step 620, the user is requested to confirm the type of file to be converted. As seen in FIG. 23, the algorithm and method according to the invention may be used with software for converting more standardized file formats such as those in DBASE format or ACCPAC. The method according to the invention assumes that a user will select an XML file and confirm that is the appropriate format. In a preferred embodiment, the software wizard suggests a file type, based on information such as the file extension, and the user can accept or select a different file type.

Figure 39:
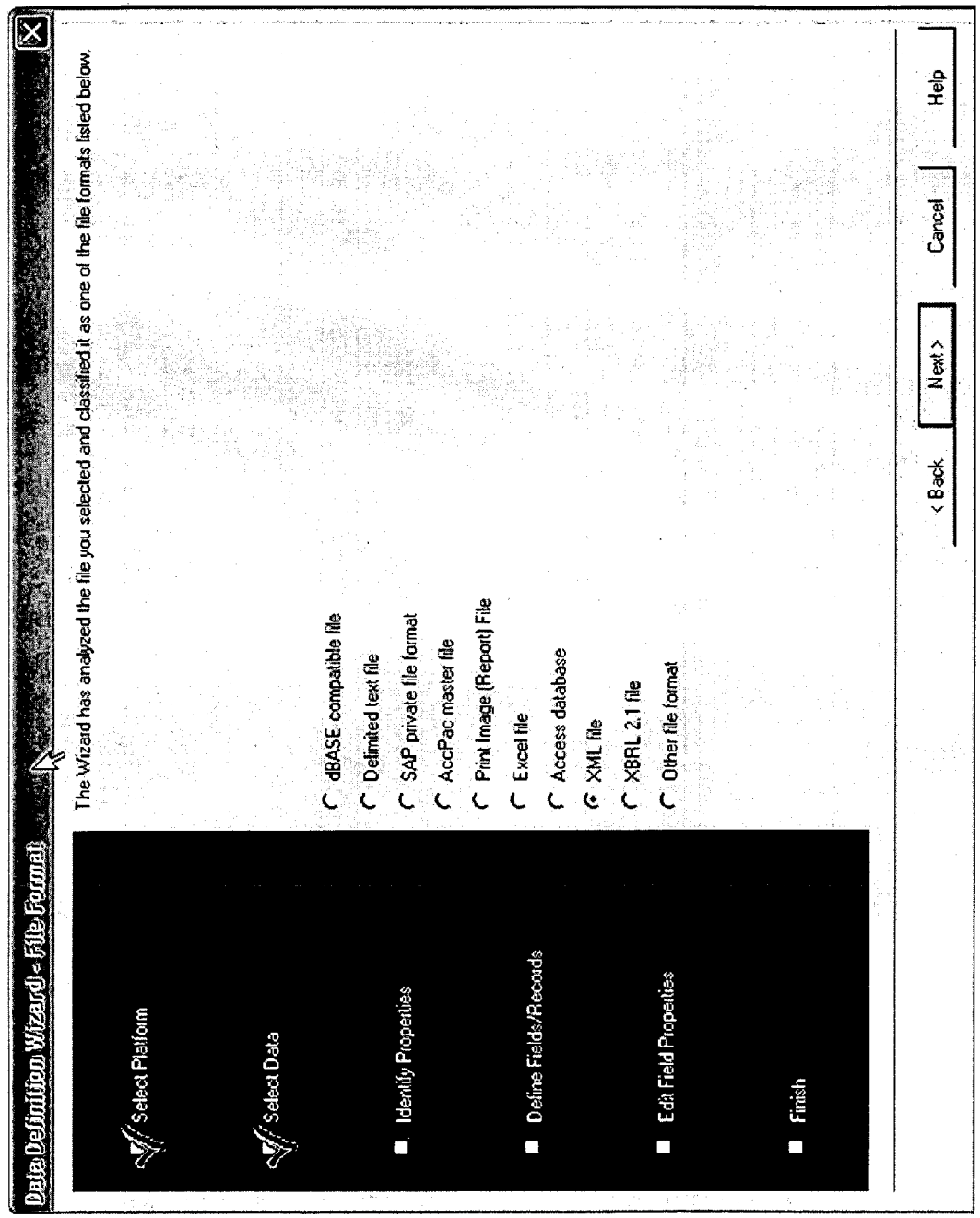
FIG. 39 is an alternative representation of a software "wizard" according to the invention.
Figure 41:
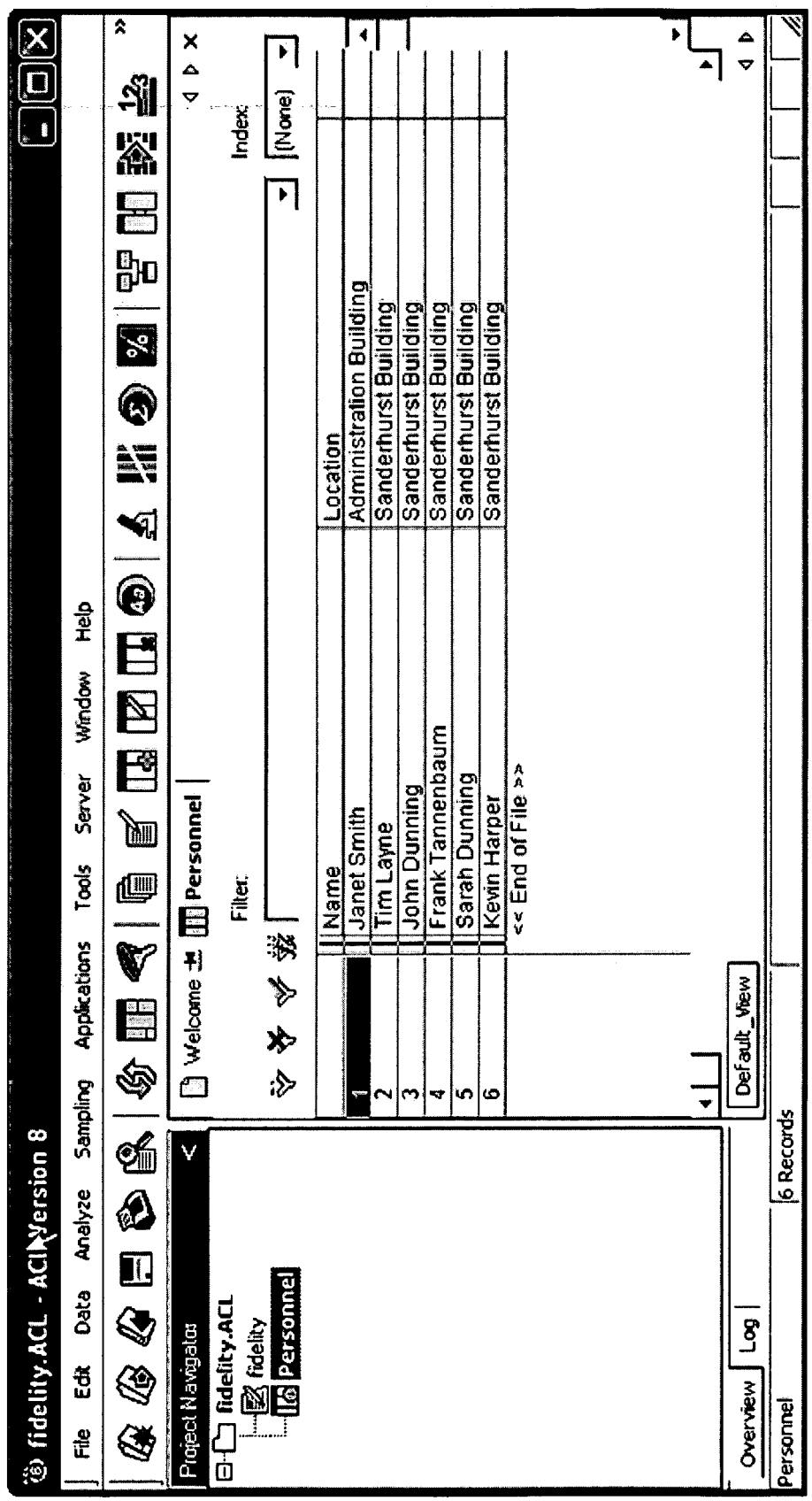
FIG. 41 is a representation of a display screen showing the table at the conclusion of the method.

In an alternative embodiment, using XML File #2 as an example, the "wizard", after the file is selected, detects the file format by looking for the proper file extension (.xml) and the XML text of the file. In such a case, the wizard presents a screen with the file format options "preselected", as seen in FIG. 39.

In step 630, the system detects the tabular structure of the selected XML file. This process is explained below with reference to FIG. 7.

Figure 24:
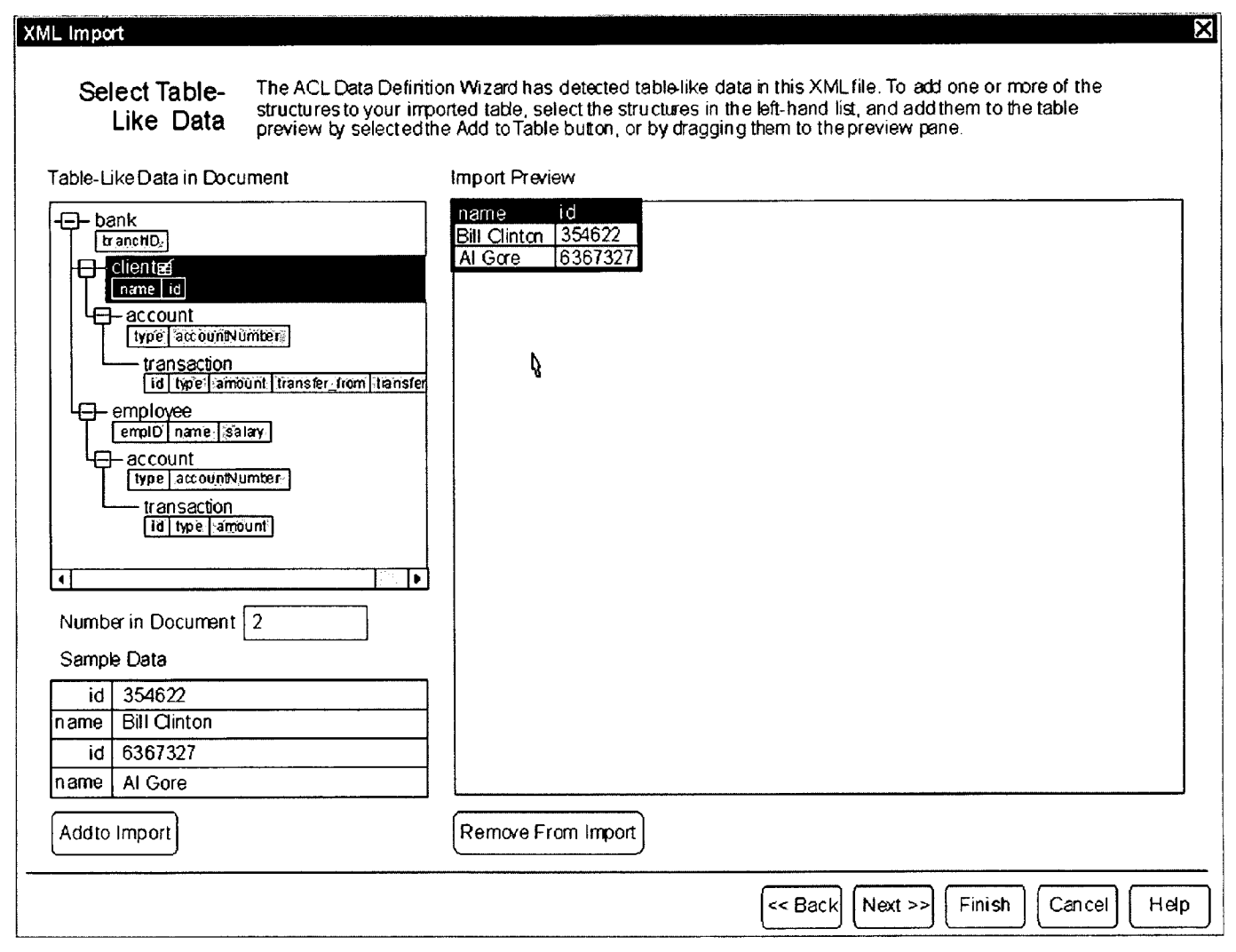

In step 640, the user selects the tabular structure of the output, based on the tabular structure of the XML file detected by the system. A preferred embodiment for the user in completing this step is seen in FIG. 24.

Figure 40:
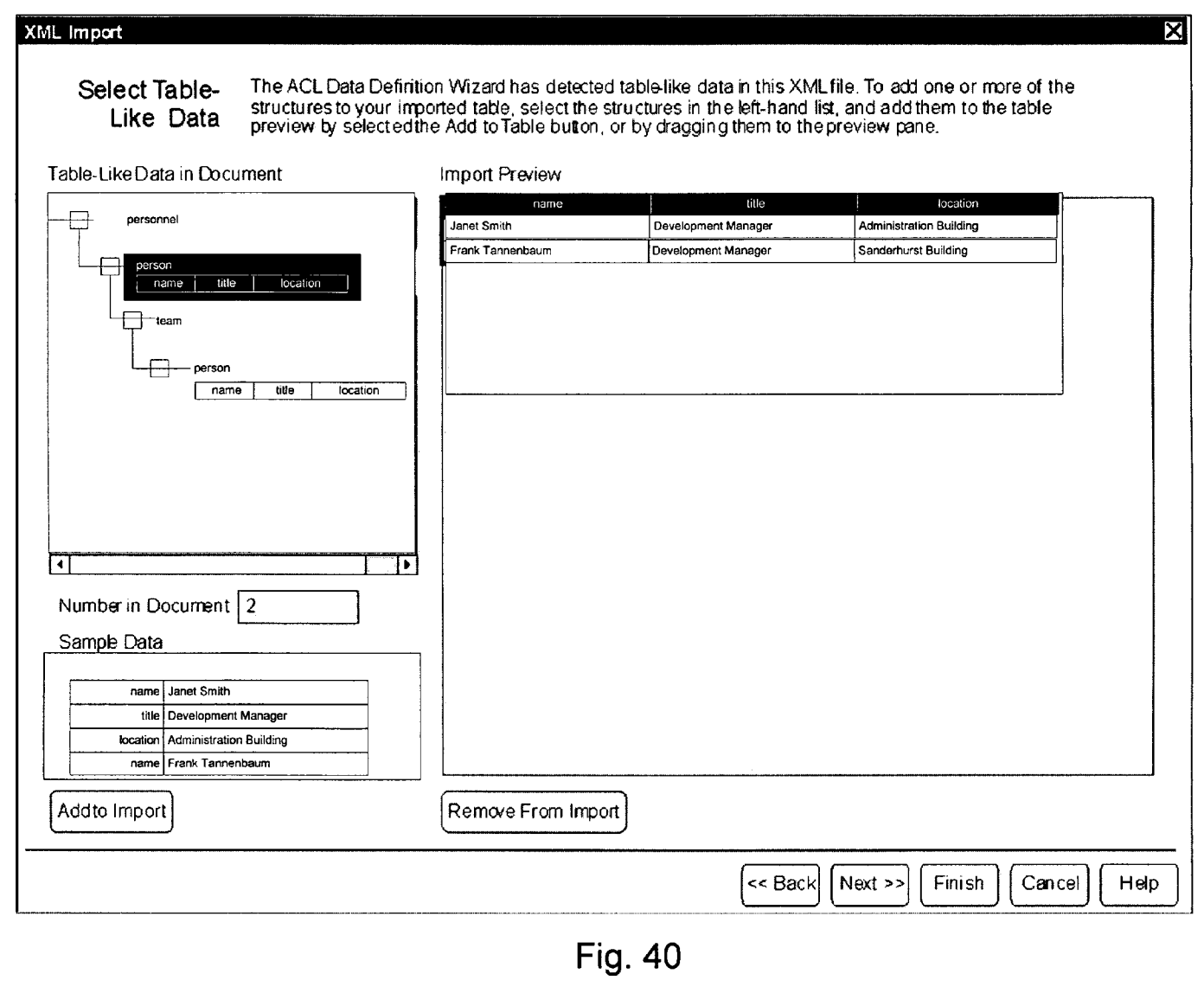

With reference to XML File #2, the user may select one of a number of possible table-like structures. When one is selected the user can drag (or select and copy) into a preview window. As seen in FIG. 40, the preview will show sample data of the eventual output. The user has the option of adding multiple "tables" as columns in the preview.

Figure 25:
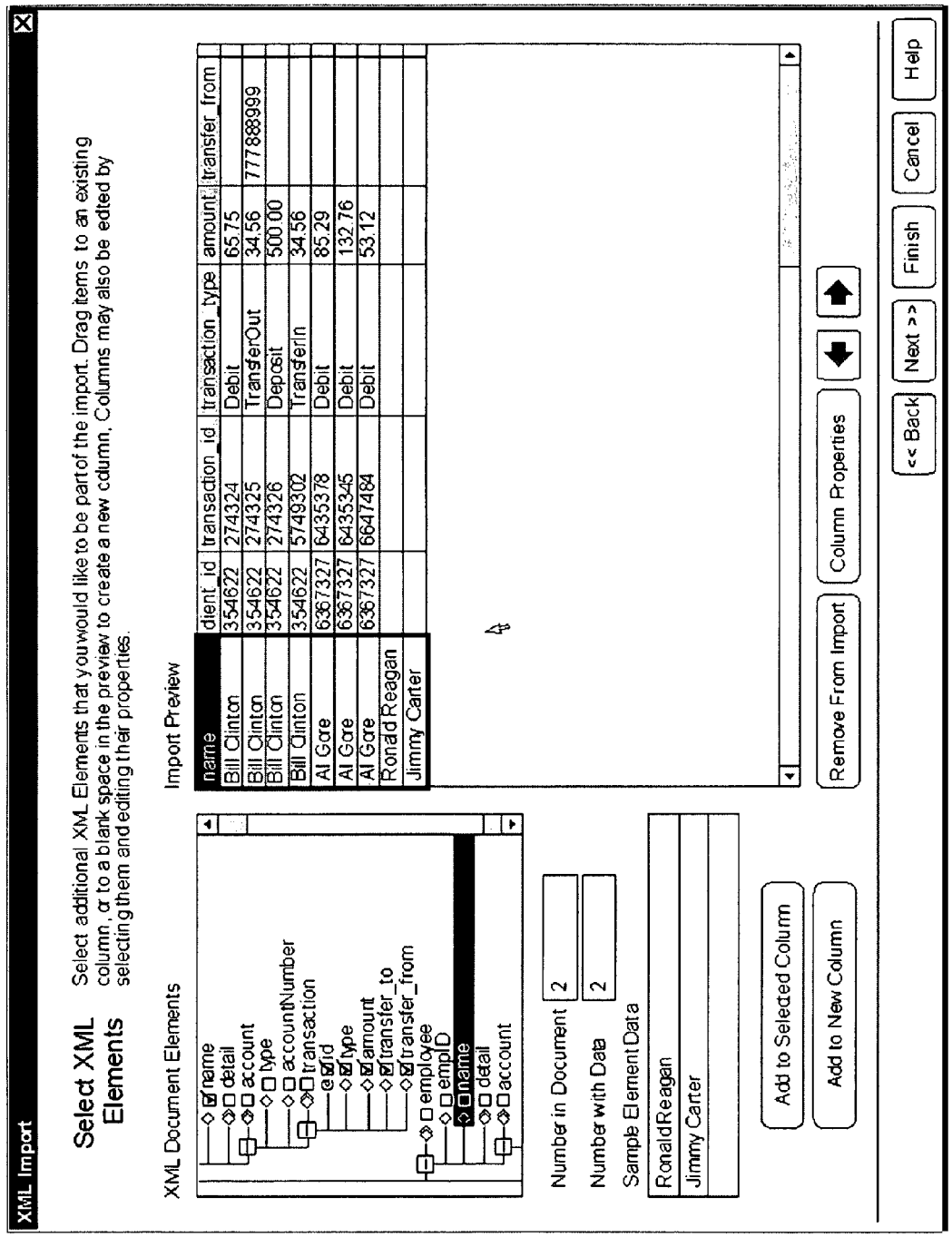
FIG. 25 is a preferred embodiment of a screen shot by which the user by which a user adds additional elements.

In step 650, the user may add additional elements to the tabular structure, besides those detected by the system, as seen in FIG. 25. This step allows users to refine their importing information. Elements include attributes, single or complex XML elements.

Figure 26:
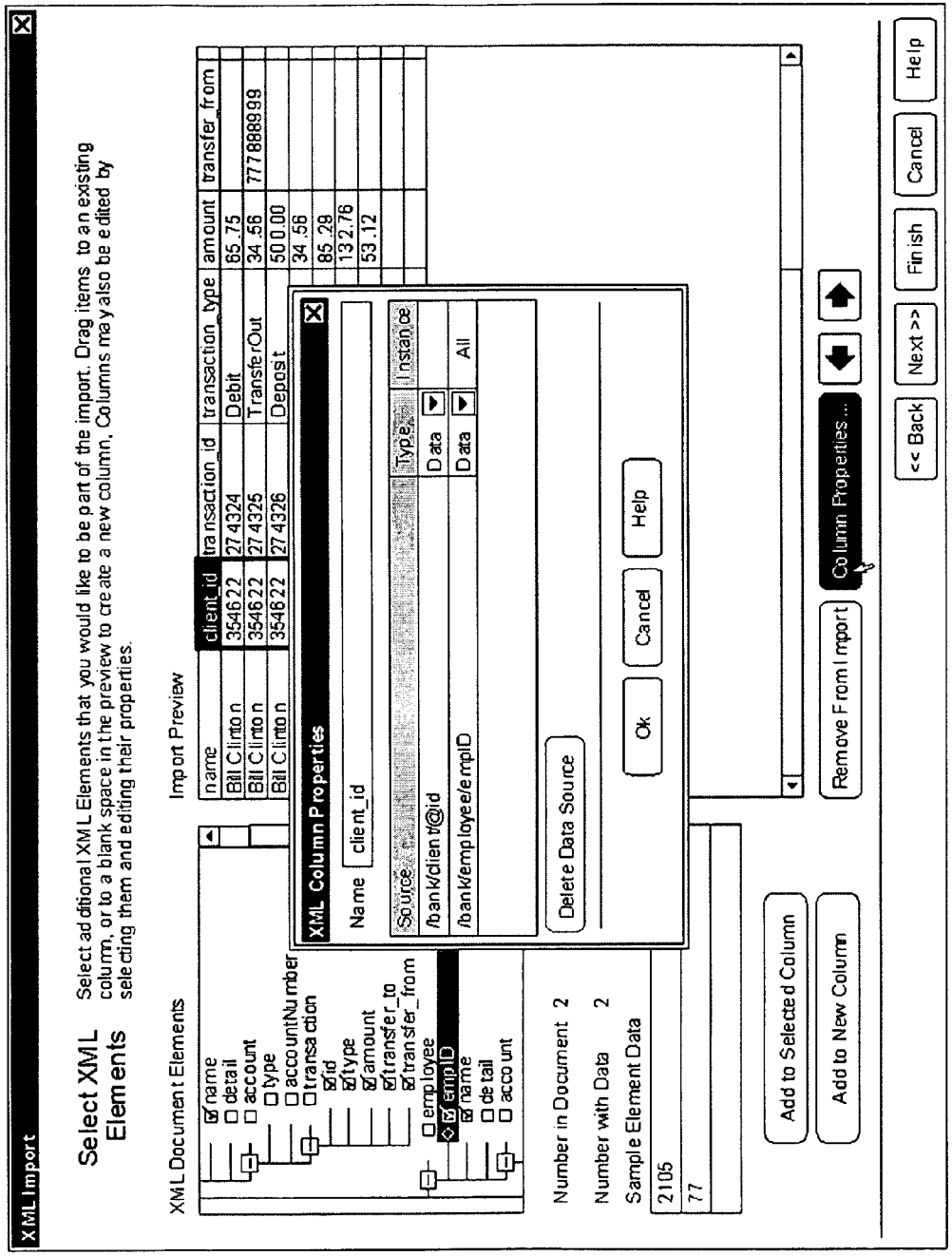
FIG. 26 is a preferred embodiment of a screen shot by which the user by which a user can modify column import properties.

In step 660, the user has the option of modifying the column input properties, as seen in FIG. 26. For instance with reference to XML File #2, people can be either from the source/personnel/person or /personnel/person/team/person. The user may want to have all people in a single column called "Name" which takes data from both sources.

In step 670, the user can modify the column type properties. A preferred embodiment for a user interface for doing so is shown in FIG. 27. From this screen, users can modify the properties of a column, as they will be represented in the output.

Figure 28:
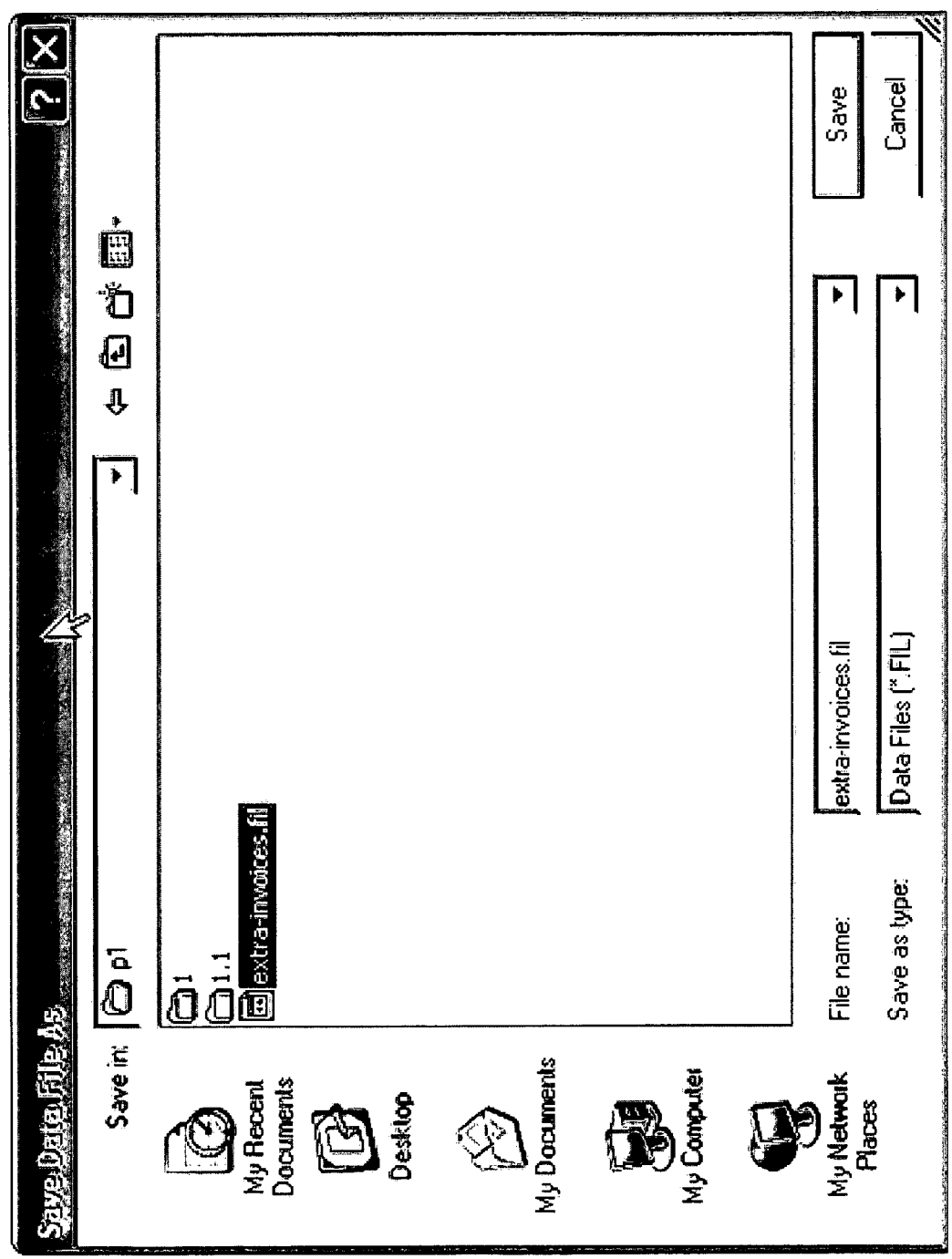
FIG. 28 is a preferred embodiment of a screen shot by which the user by which a user can select the output name and location.

In step 680, the user then selects the output file name and location. The output files may be in any format capable of handling tables. The user interface for this selection, as shown in FIG. 28 may be the standard operating system interface.

Figure 8:
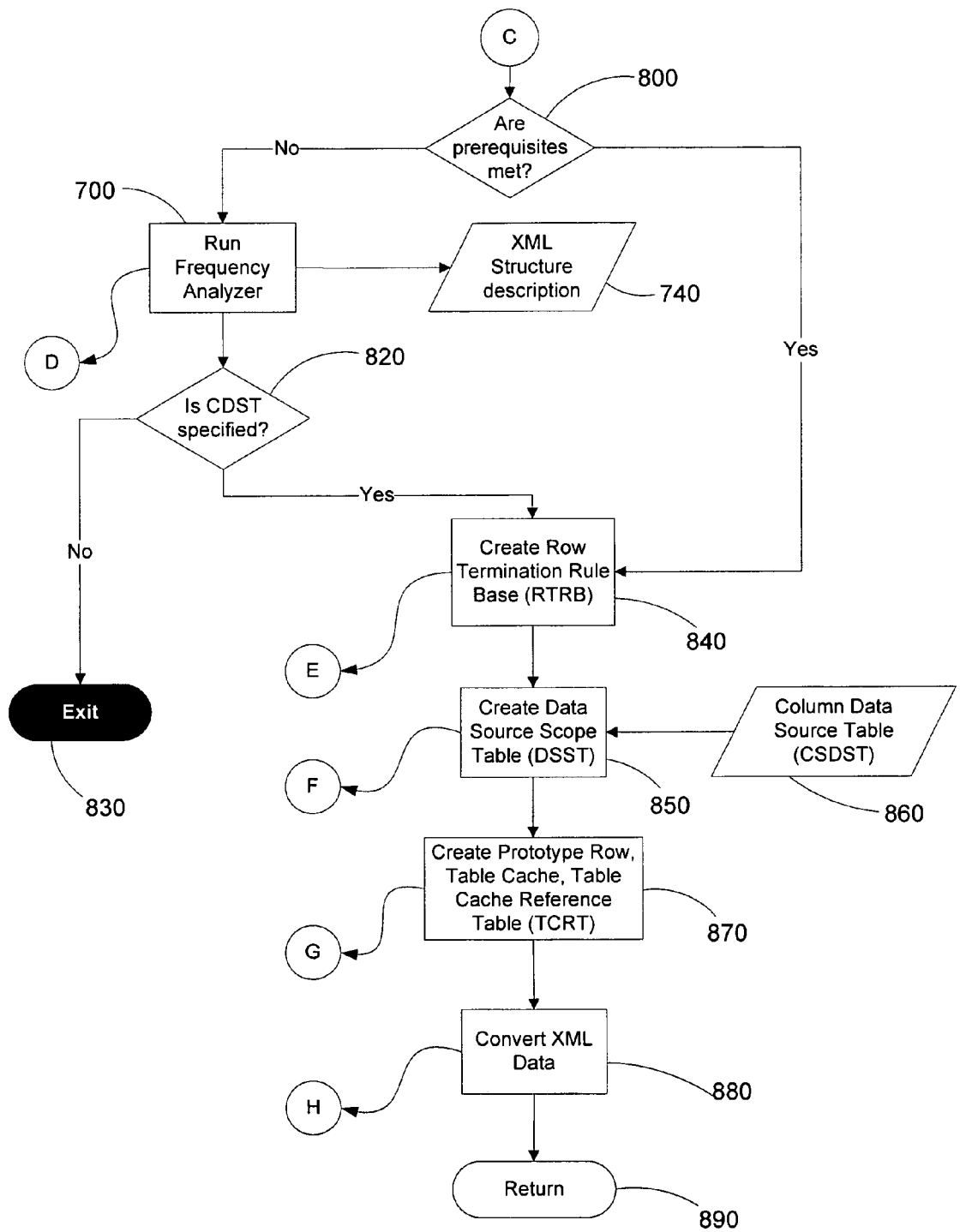
FIG. 8 is a flow chart thereof showing the method after the conversion engine has been invoked.

In step 690 the system will invoke the conversion engine, as further detailed below with reference to FIG. 8, to convert the selected XML file into the output file with the tabular structure selected.

Determining the Tabular Structure

Given the structure of the XML file, table-like entities can be determined. Any XML elements that contain data and have a one-to-one relationship with their parent (i.e.—the maximum occurrences under the parent in an entire XML document is one) can be considered as columns in a table.

Figure 7:
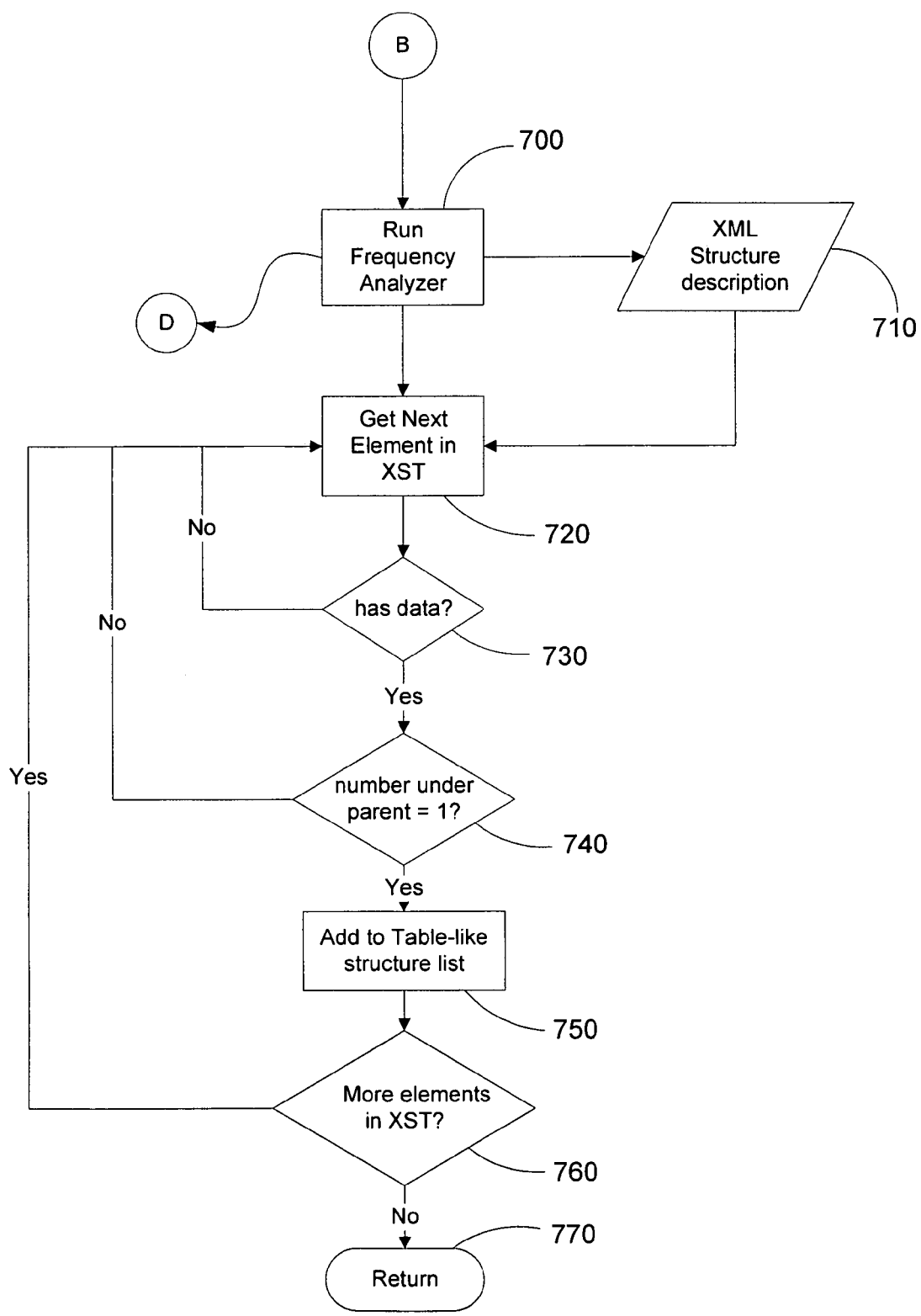
FIG. 7 is a flow chart thereof showing the detection of tabular structures according to the invention.

With reference to FIG. 7, the system detects the tabular structure of the selected XML file. In step 700, the system runs the frequency analyzer, as further detailed in FIG. 9, which outputs the XML structure description 710.

In step 720, the next element in the XML structure description 710 is examined.

In step 730, if the next element has data, the process moves to step 740; if not the following element in the XML Structure Table (XST) is examined.

In step 740, the element is tested to determine if it is the first element under the parent (i.e. the number under the parent is equal to 1). If not, the process returns to step 720 and the next element is examined. If the number under the parent is equal to 1, the element is added to the table-like structure list in step

750. The table-like structure list is a list of all table-like structures found in the document along with the path to the structure.

In step 760, the system checks if any elements remain in the XML structure description 710. If so, the process returns to step 720 and the next element is examined. If not, at step 770 the system returns (to step 630) with the completed table-like structure list and XML structure description 710.

The Conversion Engine Process

When the conversion engine is invoked (after step 690), it begins by checking if the prerequisites are met at step 800. If the prerequisites are met, the engine proceeds to step 840. If the prerequisites are not met, the frequency analyzer is called in step 700 (as detailed in FIG. 9). After the frequency analyzer has run, it returns an XML structure description 710. The system then determines if the column data source table ("CDST") 860 is specified in step 820.

If the CDST is not specified, the conversion engine process terminates (step 830). If the CDST is specified, the conversion engine calls a subroutine to create the row termination rule base ("RTRB") at step 840, as further detailed below and with reference to FIG. 10.

Following the creation of the RTRB, the conversion engine calls a subroutine to create the data source scope table ("DSST") in step 850, as further detailed below and with reference to FIG. 13. The CDST 860 is called and used by this subroutine.

The conversion engine then creates the prototype row, the table cache and the table cache reference table ("TCRT") in step 870, and as further detailed below and with reference to FIG. 14.

The conversion engine then converts the XML data (step 880) as further detailed below and with reference to FIG. 15. The conversion engine then returns the converted data (step 890).

The Frequency Analyzer

To obtain the structure of the XML file, the system reads the entire file and keeps a record of the hierarchy of XML elements encountered; the total number of elements of that type that are encountered; the maximum number of times that they appear under their parent element; and the number that contain data. The resulting information can then be used to determine row-terminating conditions and to identify table like structures. In an alternative embodiment of the invention, this information could be deduced from an XML schema file.

Figure 9:
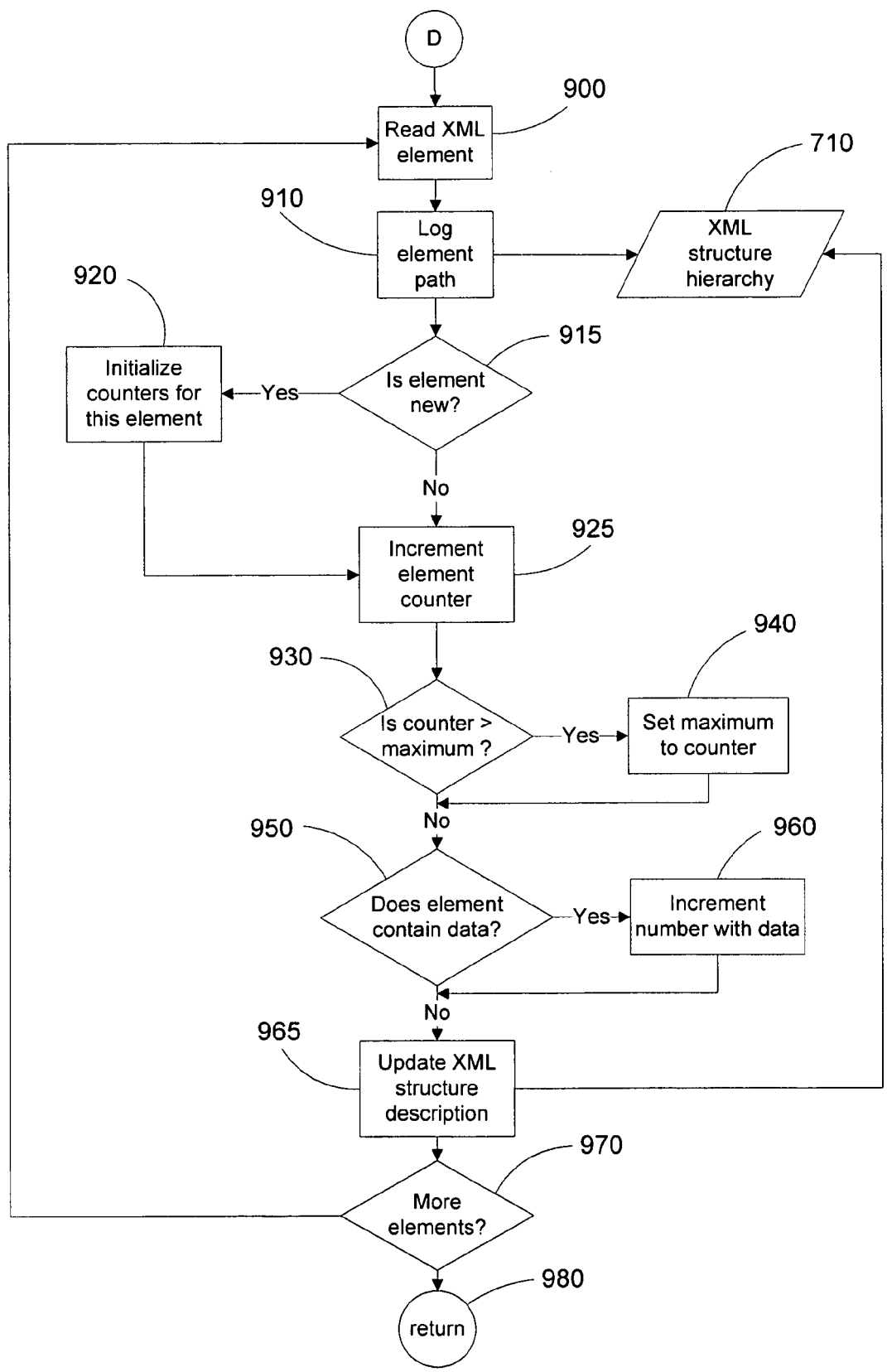
FIG. 9 is a flow chart thereof showing the frequency analyzer process.

As seen in FIG. 9, the process begins with the frequency analyzer reading the first XML element (step 900). The element's path is then logged (step 910), and inserted into the XML structure description 710.

The frequency analyzer then determines if the element is new (step 915). If the element is new, the counters are initialized for this element (step 920), following which the counter is incremented (step 925). If the element is not new, the frequency analyzer proceeds to increment the counter (step 925) without initializing.

The frequency analyzer then tests if the counter is greater than the maximum at step 930. Note the maximum is initially set to zero. If the counter is greater than the maximum, the maximum is set to the counter value at step 940.

In either case, the next step is for the frequency analyzer to check if the element contains data (step 950). If it does, the number with data column in the table is incremented (step 960).

In step 965, the XML structure description 710 is updated (step 965). Finally, the frequency analyzer checks to see if there are more elements (step 970). If there are no more elements the subroutine returns (step 980). If there are more elements, the subroutine returns to step 900 and repeats the process.

Table 5 shows the results of a frequency analysis of XML File #3 as shown in FIG. 42.

TABLE 5

| Node | # in File | # with data | Max. Freq. Under Parent |
|---|---|---|---|
| /bank | 1 | 0 | 1 |
| /bank/client | 2 | 0 | 2 |
| /bank/client/@id | 2 | 2 | 1 |
| /bank/client/name | 2 | 2 | 1 |
| /bank/client/detail | 4 | 4 | 2 |
| /bank/client/account | 2 | 0 | 2 |
| /bank/client/account/type | 3 | 3 | 1 |
| /bank/client/account/accountNumber | 3 | 3 | 1 |
| /bank/client/account/transaction | 7 | 0 | 3 |
| /bank/client/account/transaction/@id | 7 | 7 | 1 |
| /bank/client/account/transaction/type | 7 | 7 | 1 |
| /bank/client/account/transaction/amount | 7 | 7 | 1 |
| /bank/client/account/transaction/transfer_to | 1 | 1 | 1 |
| /bank/client/account/transaction/transfer_from | 1 | 1 | 1 |
| /bank/employee | 2 | 0 | 2 |
| /bank/employee/empID | 2 | 2 | 1 |
| /bank/employee/name | 2 | 2 | 1 |
| /bank/employee/detail | 4 | 4 | 2 |
| /bank/employee/salary | 2 | 2 | 1 |
| /bank/employee/account | 3 | 0 | 2 |
| /bank/employee/account/type | 3 | 3 | 1 |
| /bank/employee/account/accountNumber | 3 | 3 | 1 |
| /bank/employee/account/transaction | 7 | 0 | 3 |
| /bank/employee/account/transaction/@id | 7 | 7 | 1 |
| /bank/employee/account/transaction/type | 7 | 7 | 1 |
| /bank/employee/account/transaction/amount | 7 | 7 | 1 |
| /bank/branchID | 1 | 1 | 1 |

The results of the frequency analysis of XML File #2 are shown in Table 6.

TABLE 6

| Node | # in File | # with data | Max. Freq. Under Parent |
|---|---|---|---|
| /personnel | 1 | 0 | 1 |
| /personnel/person | 2 | 0 | 2 |
| /personnel/person/name | 2 | 2 | 1 |
| /personnel/person/title | 2 | 2 | 1 |
| /personnel/person/team | 2 | 0 | 1 |
| /personnel/person/team/person | 4 | 0 | 2 |
| /personnel/person/team/person/name | 4 | 4 | 1 |
| /personnel/person/team/person/title | 4 | 4 | 1 |
| /personnel/person/team/location | 2 | 2 | 1 |
| /personnel/person/location | 2 | 2 | 1 |

Row Termination Rule Base ("RTRB")

Given the structure of XML and a number of data sources, the method according to the invention may determine the conditions that will cause a row to be written to the table cache. These conditions will be the XPath-like structure that will be exited while processing the XML file. In other words, when exiting each element, the algorithm will check the current location against the list of row-terminating conditions. If one matches the current location, then the row will be written to the table cache.

For example the data sources in XML File #3 are shown in Table 7.

TABLE 7

| Column Name | Data Source |
| --- | --- |
| Name | /bank/employee/name/text( ) |
|  | /bank/client/name/text( ) |
| ID | /bank/employee/empID/text( ) |
|  | /bank/client/@id/text( ) |

As seen in FIG. 1, a tree representing the XML structure is created, comprising linked nodes. The list of data sources is examined one at a time, and the XML structure node that represents the last node of the data source is marked, and a link is provided between the column data source and the marked node. (Note—in FIGS. 1 through 4, the symbol ✧ indicates that there are more than one of these elements under a single parent, while the symbol ◇ indicates that there is always only a single instance under its parent.)

Each node linked to the column data source is examined in turn. The node will be become unmarked if both of the following are true:
  the node has a one-to-one relationship with its parent; and
  none of the node's descendents is marked as belonging to a column data source.

The node's parent is then examined, if one exists. If the node is unmarked and is not already directly associated with one of the other column data sources, then the parent node is marked and associated with the column data source being examined. If the node is already associated with another column data source, then the association with the current data source is abandoned.

This process continues as long as the algorithm is able to climb the tree hierarchy before one of the conditions fails.

Figure 2:
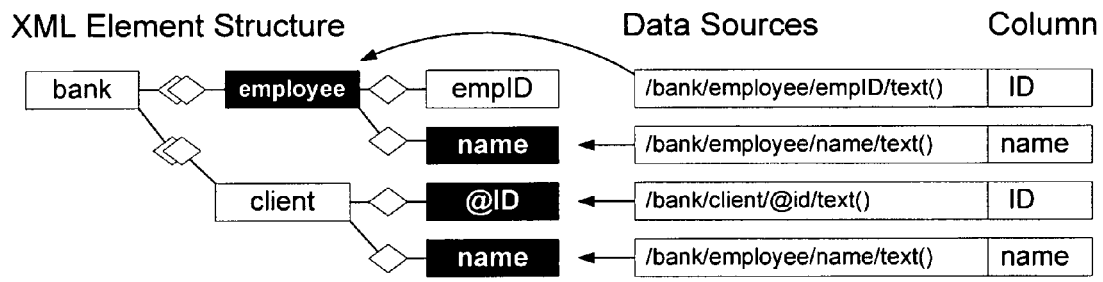
FIG. 2 is a tree diagram showing the processing thereof.

As seen in FIG. 2, in the case of the first column data source in the previous example, the highest associated node would be /bank/employee, as it has a many-to-one relationship with /bank, AND it has a child referenced by another column data source (the Name column data source of /bank/employee/name/text is associated with the /bank/employee/name node).

Figure 3:
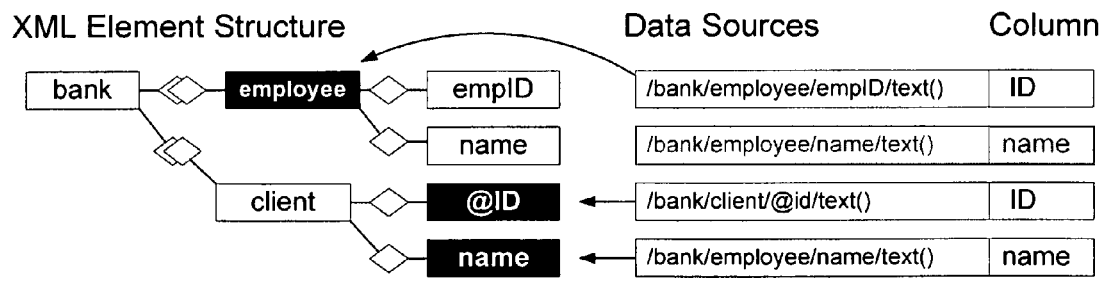
FIG. 3 is a tree diagram showing the further processing thereof.

As seen in FIG. 3 after processing the first column data source node association, the next one is moved to, and the same analysis is performed. In the case of XML File #3, the parent node of /bank/employee/name is already associated with another column data source, and so the link is abandoned.

Figure 4:
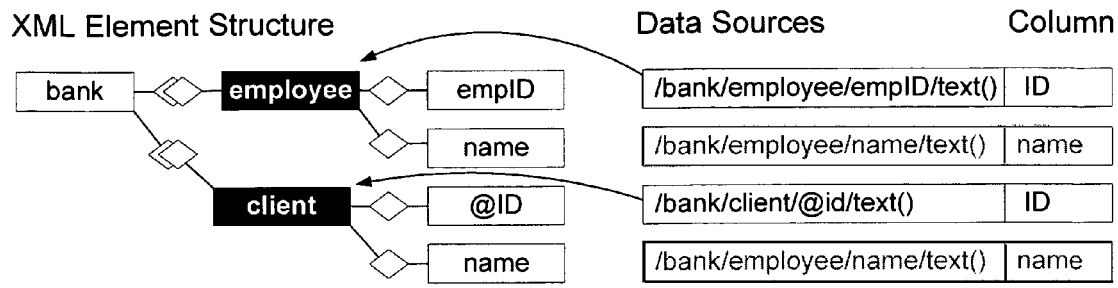
FIG. 4 is a tree diagram showing the remaining associations thereof, after processing.

After processing all data sources, if any changes were made to the state of the XML structure, then the process is repeated. After all processing, the resulting changes are made, and the remaining associations are as seen in FIG. 4.

The two row-terminating conditions that are found in the example are /bank/employee and /bank/client. The individual column data sources are then matched to the row terminating condition most closely matching their structure, and are used for conversion of the data.

Figure 10:
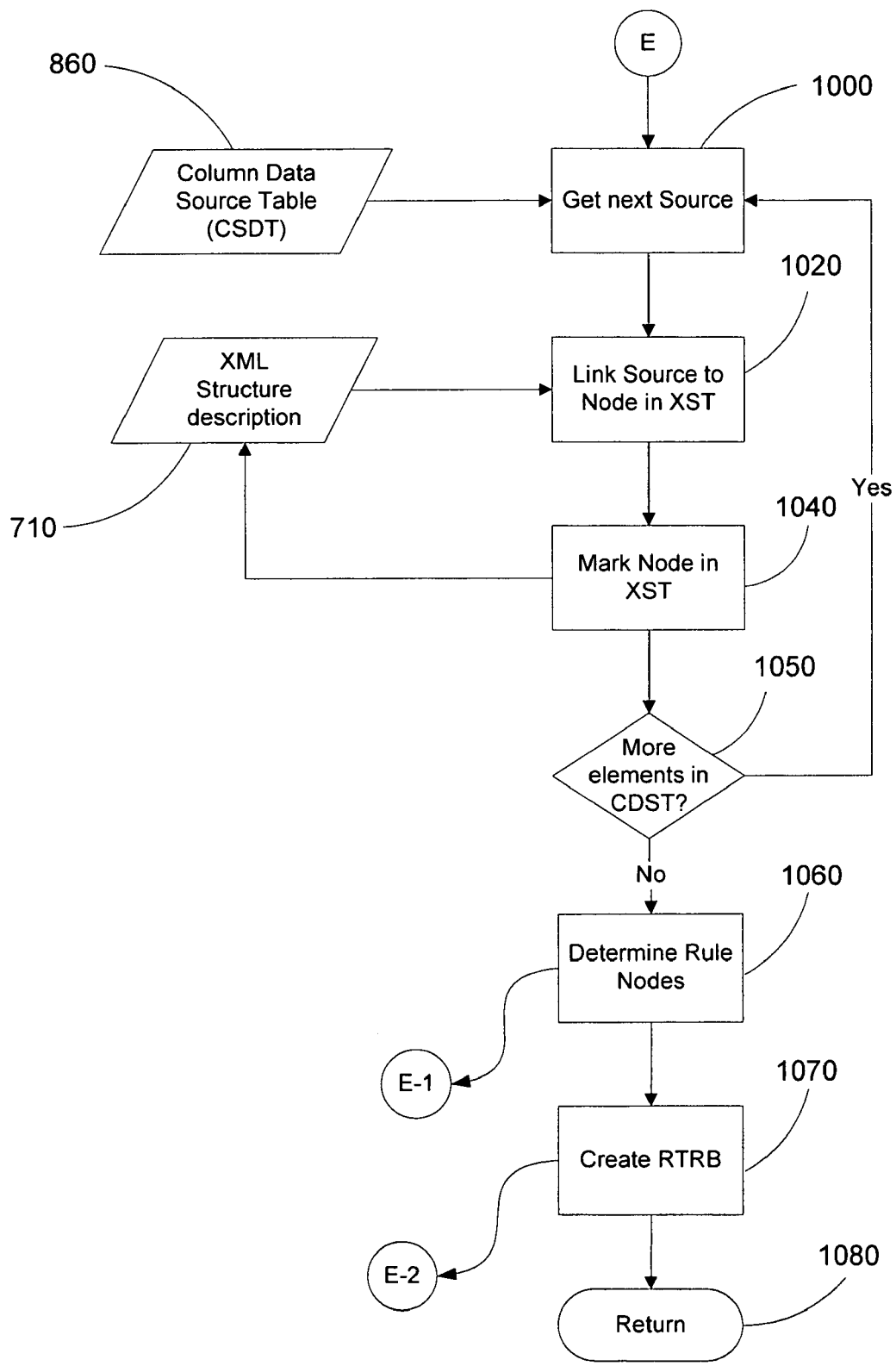
FIG. 10 is a flow chart thereof showing the method by which a row termination rule base is created.

Now with reference to FIG. 10, the algorithm will be explained in detail. In step 1000, the subroutine gets the next source from the CDST 860. This source is then linked to a node in the XML Structure Description ("XST") 710 at step 1020 and the node is marked in the XST (step 1040) and the XST 710 updated.

At step 1050, the system determines if there are more elements in the CDST 860. If there are, the process begins again at step 1000. If there are no more elements the system determines the rule nodes (described below and with reference to FIG. 11) at step 1060 and then creates the RTRB (described below and with reference to FIG. 12) at step 1070.

Following the creation of the RTRB, the subroutine returns (step 1080).

Determining Rule Nodes

Figure 11:
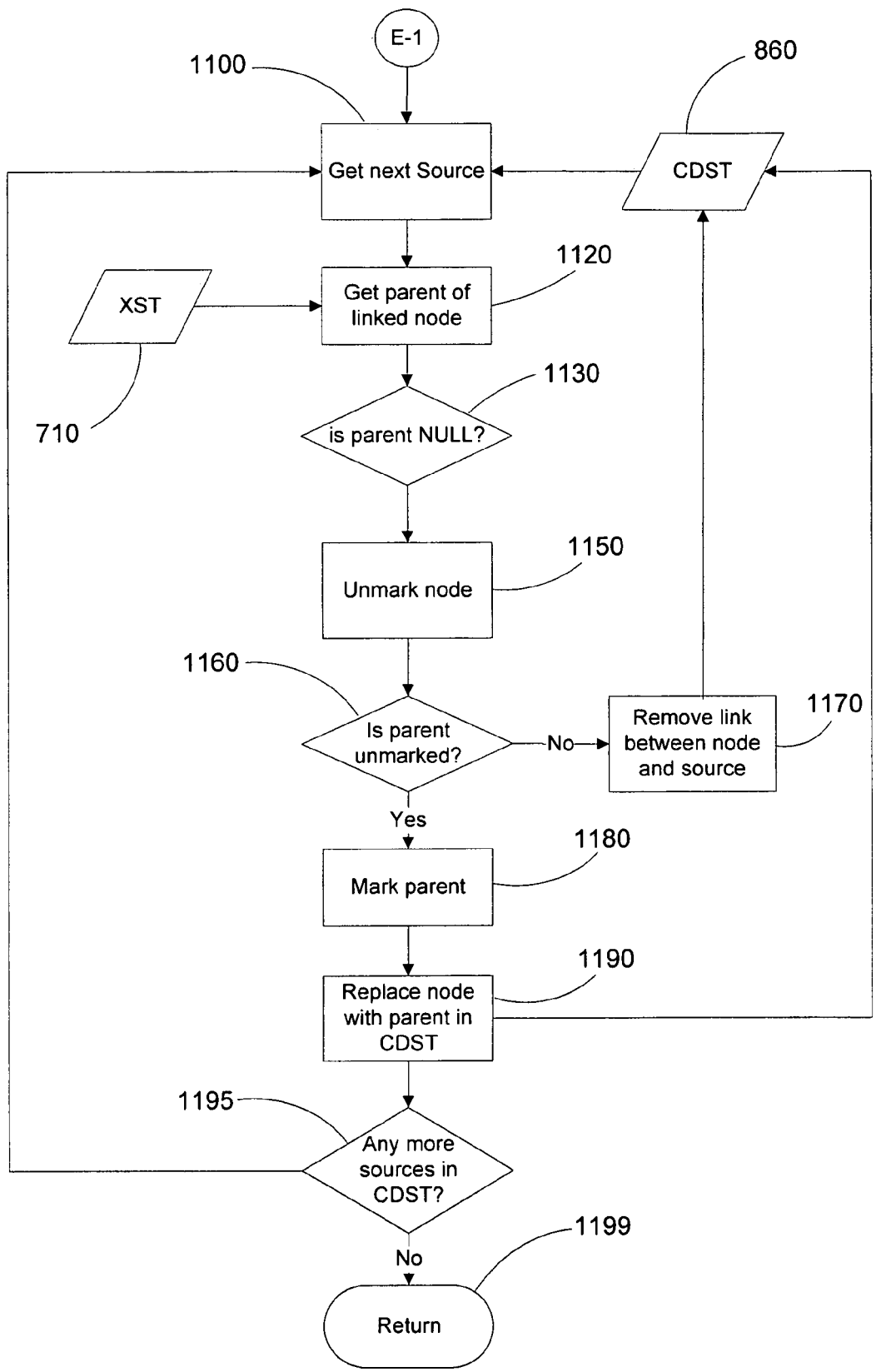
FIG. 11 is a flow chart thereof showing the method by which rule nodes are determined.

To further detail the manner in which rule nodes are created, reference is made to FIG. 11. The process begins with the system getting the next source (step 1100) from the CDST 860. The subroutine then gets the parent of the linked node (step 1120) from XST 710 and determines if the parent is NULL (step 1130) If the parent is NULL the particular path has ended and the subroutine backtracks to the next starting node. The node is then unmarked (step 1150).

The system then determines if the parent is unmarked (step 1160). If the parent is not unmarked, the link between the node and source is removed (step 1170) and CDST 860 is updated, and the next source is examined (step 1100). If the parent is unmarked, it is then marked (step 1180), and the node is replaced with the parent in CDST 860 (step 1190).

The system then checks if there are any more sources in CDST 860 (step 1195). If there are more sources, the next source is examined (step 1100), and if not the subroutine returns (step 1199).

Creating the RTRB

Figure 12:
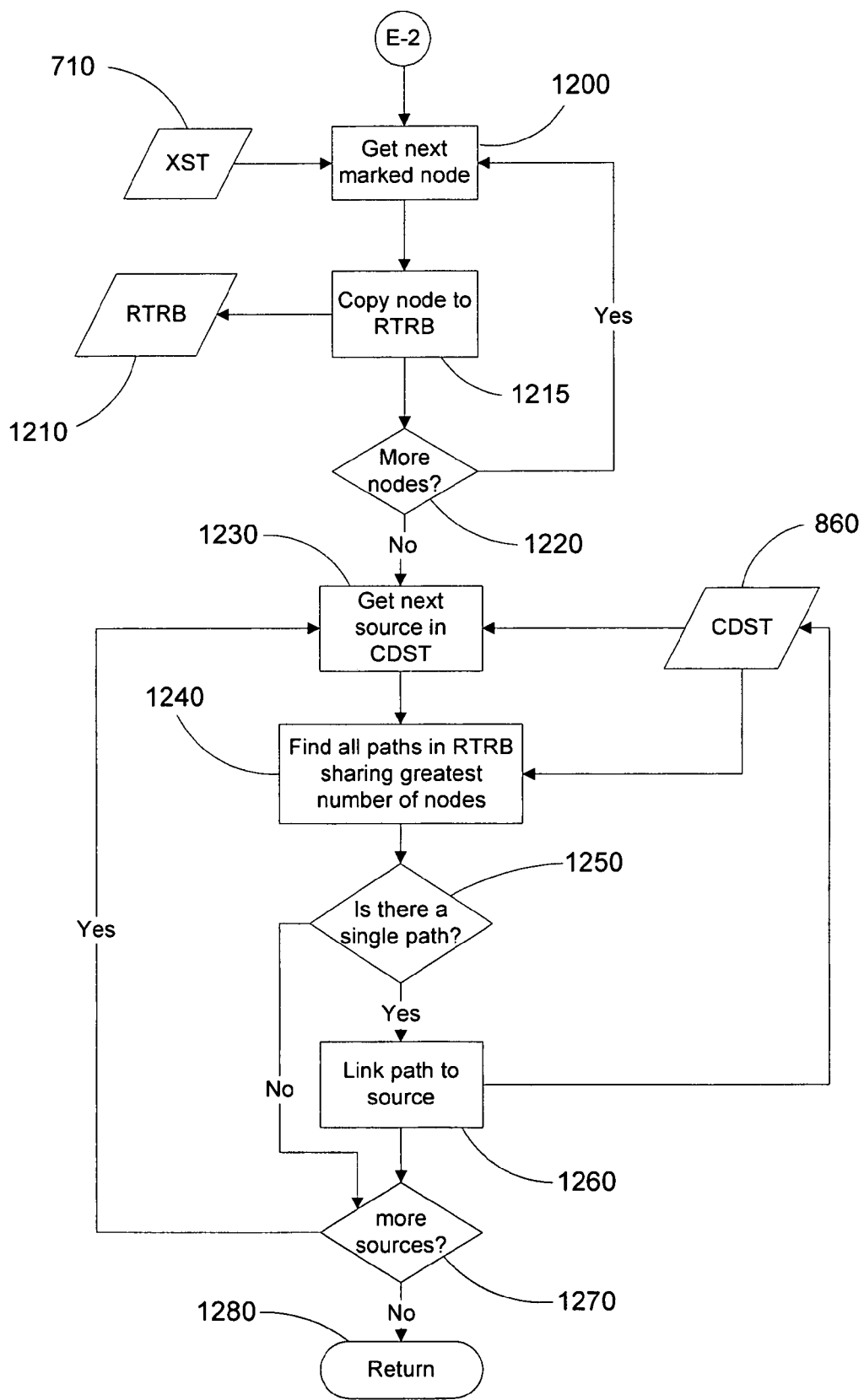
FIG. 12 is a flow chart thereof further showing the method by which a row termination rule base is created.

To further detail the manner in which the RTRB 1210 is determined, reference is made to FIG. 12. In step 1200, the system examines the next marked node from the XST. This node is then copied to RTRB 1210 (step 1215).

The system then examines if there are more nodes (step 1220). If there are, the next node is obtained (step 1200). If not, the next source is obtained (step 1230) from CDST 860.

The system then finds all paths in RTRB 1210 sharing the greatest number of nodes (step 1240), using CDST 860 and determines if there is a single path (step 1250). In this process, each column data source is compared to each row terminating condition path and the number of matching nodes (on a left-to-right basis) are tallied. For example, using XML File #3 as the column data source: \bank\client\account\type\text() compared to row-terminating conditions has the results as shown in Table 8.

TABLE 8

| Row-Terminating Condition | Matching Nodes |
| --- | --- |
| \bank\client | 2 |
| \bank\client\account | 3 |
| \bank\employee | 0 |

In this case the column data source becomes associated with the "winner", i.e. \bank\client\account. In the event of a "tie", the column data source is not associated with any particular row terminating condition. The path is then linked to the source (step 1260) and CDST 860 updated.

The system then checks if there are more sources (step 1270). If there are the next source is obtained (step 1230) and if not the subroutine returns (step 1280).

Figure 38:
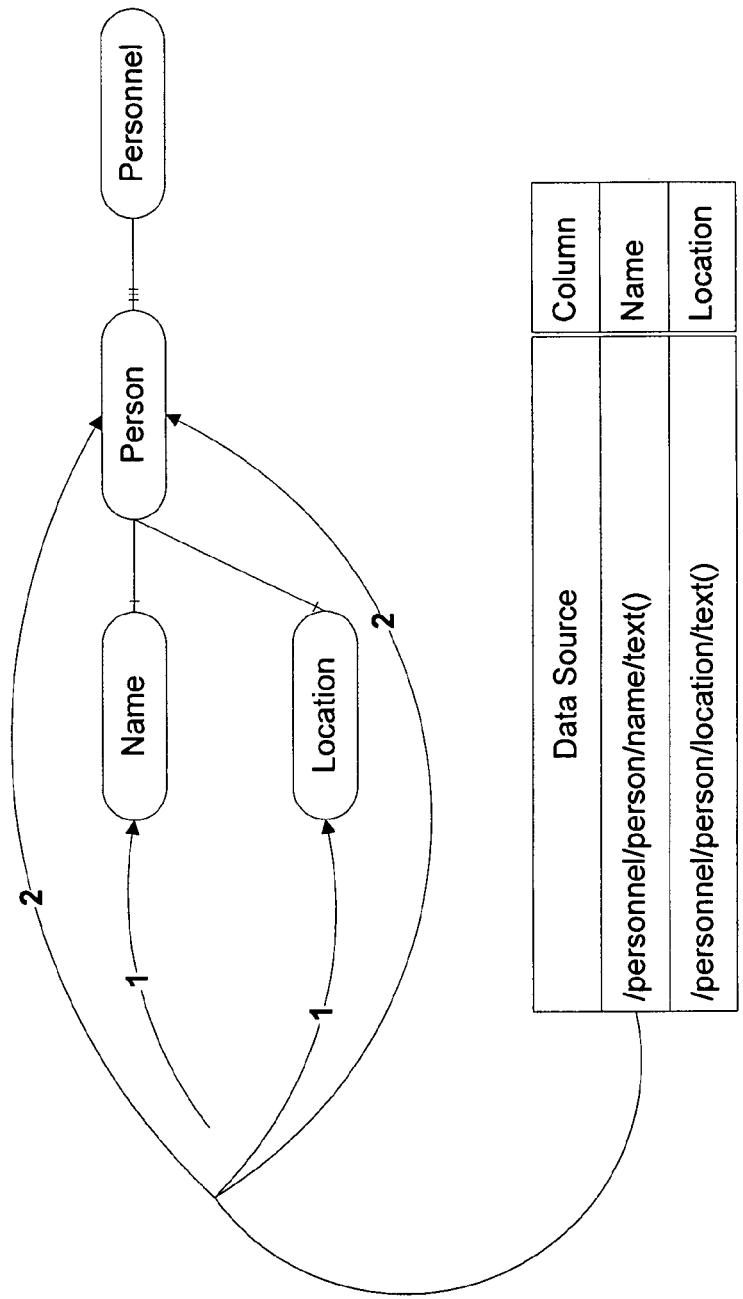
FIG. 38 is a an alternate representation of a data structure according to the invention and associated tables.

With reference to XML File #2, and to FIG. 38, for each source in CDST 860, the XST 710 is scanned to determine the highest node path associated with a column data source which does not have a 1::1 relationship with its sibling. In XML File #2 this corresponds to the rules /personnel/person and /personnel/person/team/person.

These are obtained, with reference to FIG. 38, by linking the data source to the same node in the XML structure for columns "Name" and "Location" (the paths marked "1"). The parent is then examined. If it is non-null and parent marked, then data source value is replaced with this node. In the example both columns point to /personnel/person (the paths marked with "2"). Then all column sources are scanned and the longest common path is located. If there is a single path in common it is placed into RTRB 1210. This is repeated for all data sources and the above mentioned rules are determined.

Creating the Data Source Scope Table ("DSST")

The "scope" of a column data source (i.e. the XML location pattern that signals clearing the data from the prototype row) is determined by comparing each data source with its associated row termination condition. The number of matching nodes in the XPath, as read from highest level to lowest, is the data source's scope.

For example, if a data source is specified to be:
/inventory/item/product_number/prefix/text( )

and the associated row-termination rule for that data source is determined to be:
/inventory/item then the scope would be /inventory/item. Similarly, if the column data source is:
/planet/@name/text( )

and the associated row-terminating condition is:
/planet/continent/nation then the scope would be /planet (the column with the data source /planet/@name/text( ) would not be cleared from the prototype row until the algorithm exited from the XML element /planet).

Figure 13:
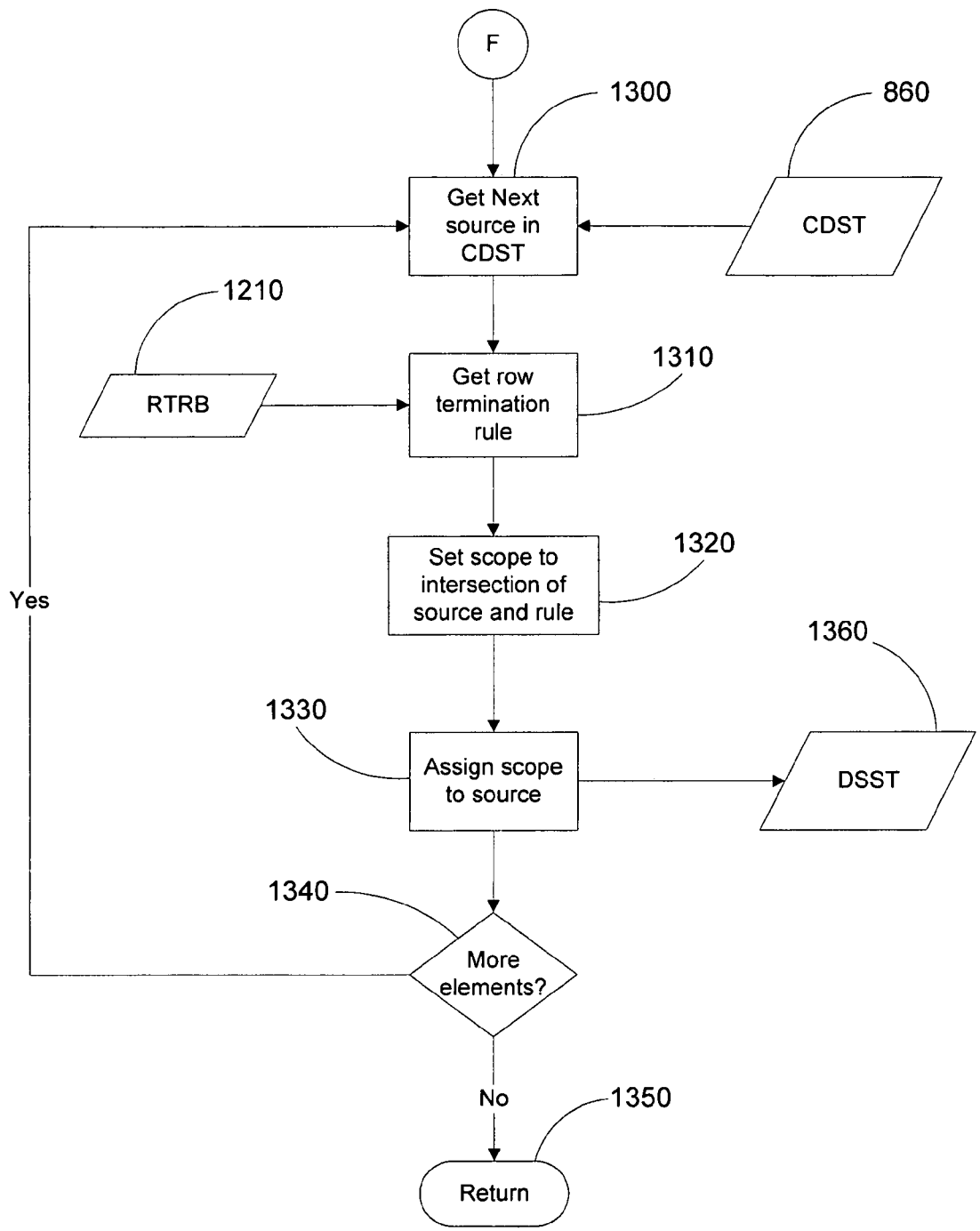
FIG. 13 is a flow chart thereof, showing the method by which a data source scope table is created.

With further reference to FIG. 13, the system, to create DSST 1360, begins, at step 1300, by getting the next source from CDST 860. The system then obtains the row termination rule (step 1310) from RTRB (1210). The scope is then set to the intersection of the source and rule (step 1320), following which the scope is assigned to the source (step 1330) and stored in DSST 1360.

The subroutine then checks if there are more elements (step 1340). If no, the subroutine returns (step 1350), and if there are more elements the next source in the CDST 860 is obtained.

With reference to XML File #2, the scopes are determined to be "/personnel/person" for /personnel/person/name/text( ) and "/personnel/person/team/person" for /personnel/person/team/person/name/text( ).

Creation of Prototype Row, Table Cache and Table Cache Reference Table ("TCRT")

Prototype Row

As the algorithm traverses different elements in the XML file, the data associated with XML elements that meet the criteria of the column data sources are accumulated in the prototype row, where they remain until erased either by overwriting or because the data source's scope has been left during the file's traversal.

When a column's data source is encountered, the element's data is given to the prototype row, along with the name of the column it belongs in, the depth of the data source's scope, and the data source's associated row termination rule.

If the row-terminating condition is the same as the one currently associated with the data in the prototype row, the data is simply added to it. If they are different, however, then the data in the prototype row is written to the table cache, and any column data not associated with the new row-terminating condition is erased from the prototype.

In certain circumstances, if the data being written to the prototype row would result in overwriting data that has not yet been written to the table cache (either by output of the prototype row or through backfilling cached items) then the data in the prototype row is written to the table cache, and any column data not associated with the new row-terminating condition of the data source being added is erased from the prototype row.

Note that when writing to the table cache, the prototype row also informs the cache of the data source's scope depth, as this information is needed to clear out-of-scope references to data that might be backfilled.

Table Cache

As XML structures can be quite fluid, sometimes data for a new row is encountered before the previous row has been completely populated. For example, in XML File #3 the branch ID is located at the very end of the document.

Keeping all rows in memory until the file is complete would be undesirable for very large files. The table cache eliminates the need to maintain these kinds of rows.

As rows are written to the table cache, references are held that contain the column, and the row-terminating condition that was associated with the data in the column. When valid columnar data is encountered while processing the XML document, the information is passed to the table cache in order to update any columns that are still in scope.

As elements are exited, the depth of the current element is passed to the table cache. This allows the table cache to clear any references greater than that depth, as they have gone out of scope, and may no longer be updated.

The Process

Figure 14:
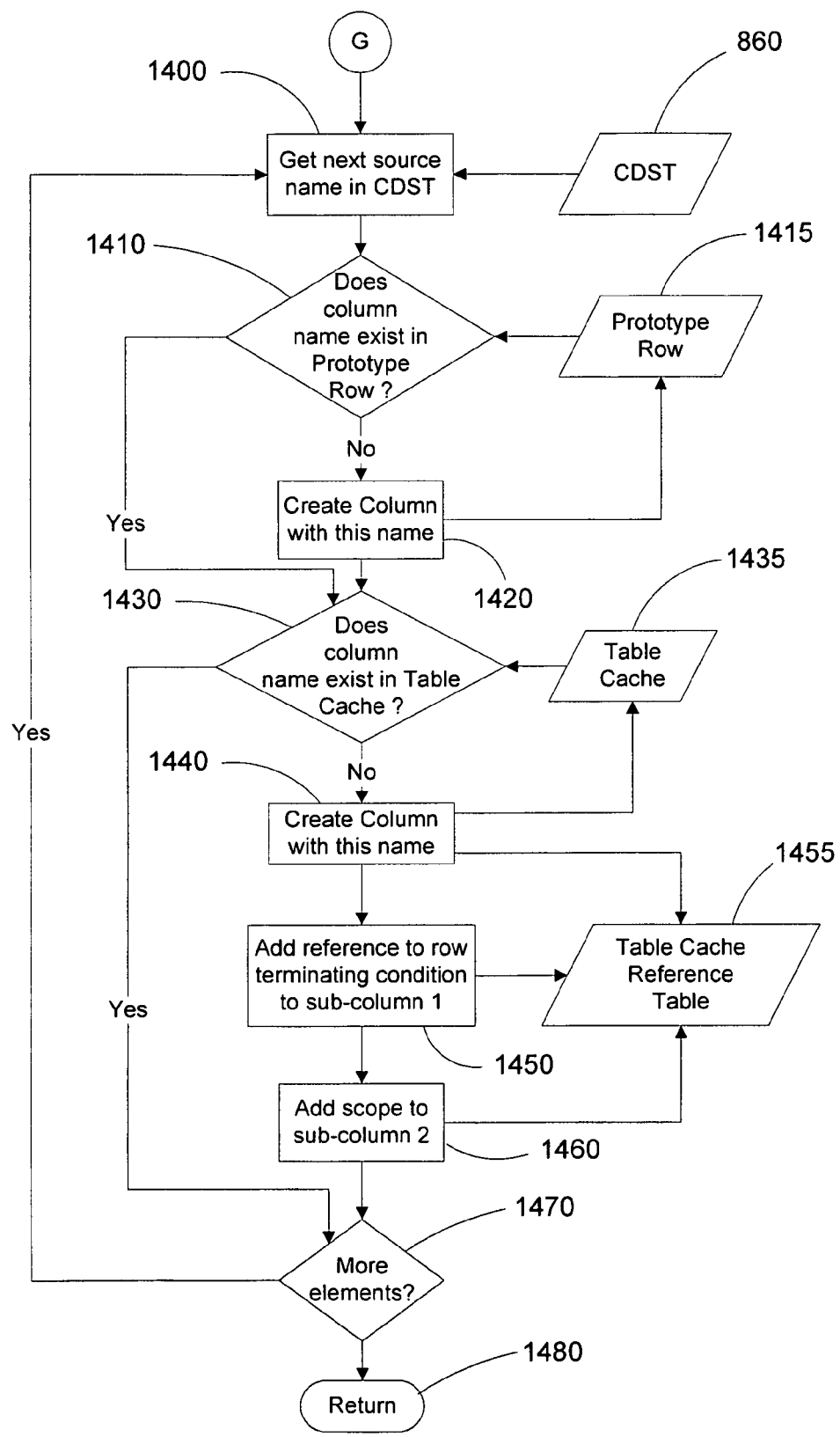
FIG. 14 is a flow chart thereof, showing the method by which a prototype row, a table cache, and a table cache reference table are created.

To further detail the subroutine, and with reference to FIG. 14, at step 1400, the subroutine gets the next source name in CDST 860. Next, in step 1410, the subroutine checks to see if the column name exists in prototype row 1415. If not, a column is created with that row (step 1420) and stored in the prototype row 1415 and step 1410 is repeated.

If the column name exists in prototype row 1415, in step 1430, the subroutine checks if the column name exists in table cache 1435. If it does, the subroutine moves to step 1470. If not, a column with that name is created (step 1440) and stored in table cache 1435 and the table cache reference table 1455. A reference to the row terminating condition (step 1450) is also added to sub-column 1 of the table cache reference table 1455. The scope is then added to sub-column 2 (step 1460) of the table cache reference table 1455.

The subroutine then checks if more elements are available in CDST 860 at step 1470. If not, the subroutine returns (step 1480), and if so, the next source name is in the CDST is obtained (step 1400) and the process begins again.

With reference to XML File #2, on creation of the prototype row, table cache and table cache reference table, the prototype row is shown in Table 9.

TABLE 9

| Prototype Row: | |
|---|---|
| Name | Location |

The table cache is shown in Table 10.

TABLE 10

| Table Cache: | |
|---|---|
| Name | Location |

The table cache reference table is shown in Table 11.

TABLE 11

Table Cache Reference Table

| Name | Location | Row |
|------|----------|-----|
|      |          |     |

The system is then ready to begin a single pass through the XML file to produce the table.

Convert XML Data

Figure 15:
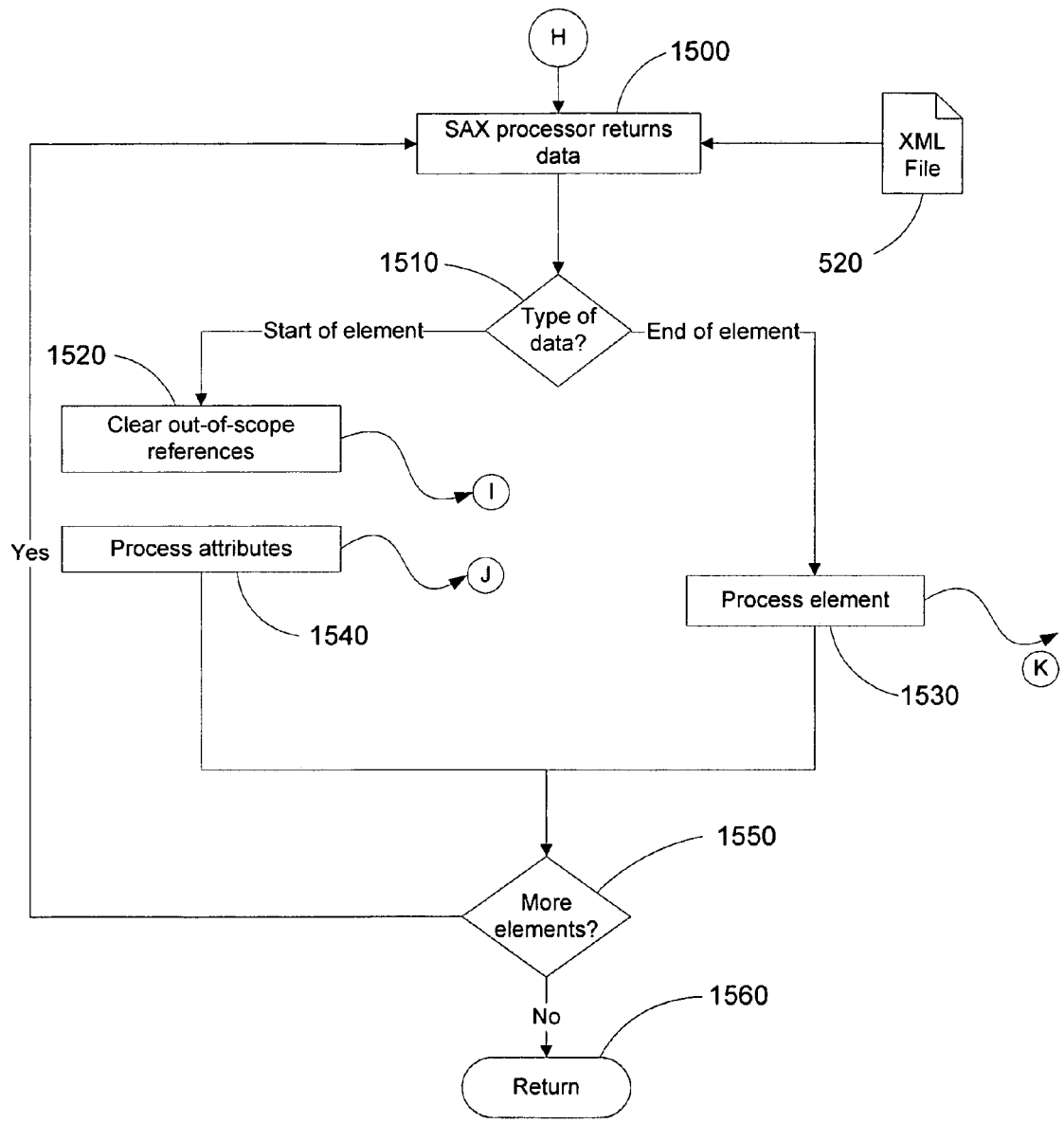
FIG. 15 is a flow chart thereof, showing the method by which the XML data is converted.

With reference to FIG. 15, the system then begins to convert the XML file into a tabular format. The process begins at step 1500, with the subroutine obtaining data from XML file 520. The data may be obtained through the use of a SAX processor or other means known in the art. The system then checks if the data is the start of an element or the end of an element (step 1510). If the data is the start of an element, the out-of-scope references are cleared (step 1520), as further detailed in FIG. 16.

If the data is the end of an element, the element is processed (step 1530) as further explained below and with reference to FIG. 18. The attributes of the element are then processed (step 1540) as further explained below and with reference to FIG. 17.

The system then checks if more attributes are present (step 1550). If not, the subroutine ends (step 1560). If so, the process returns to step 1500.

With reference to XML File #2, the system obtains the first element having a title: <name>, data: Janet Smith, and XPath: /personnel/person/name.

Clearing Out of Scope References

Figure 16:
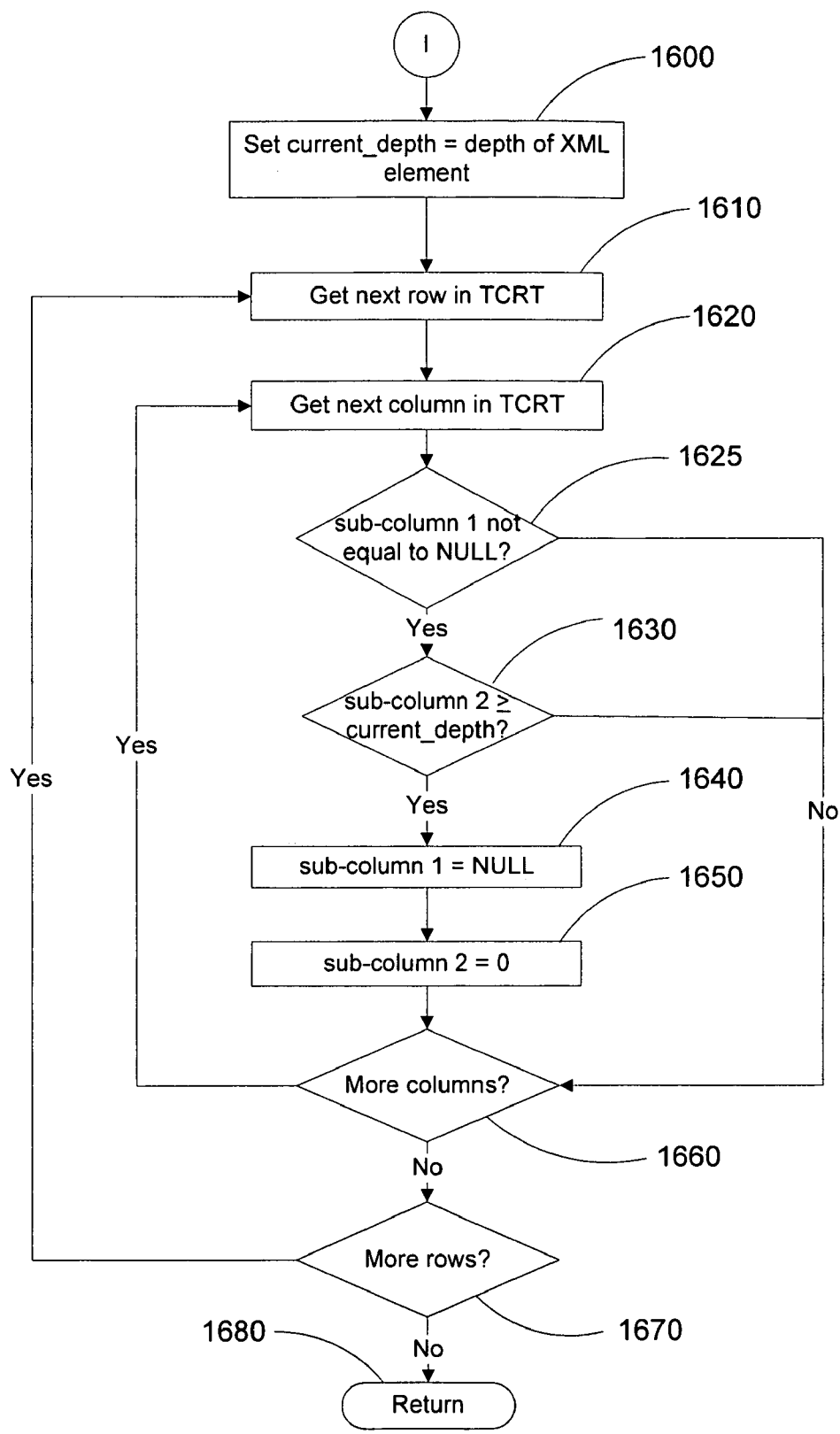
FIG. 16 is a flow chart thereof, showing the method by which out of scope references are cleared.

With reference to FIG. 16, the system clears out of scope references when appropriate. In step 1600, the current_depth variable is set to the equal to the depth of the XML element. The next row is then obtained from the TCRT 1455 at step 1610. The system then obtains the next column from TCRT 1455 at step 1620. If sub-column 1 is not NULL (step 1625) and sub-column 2 is greater than or equal to the current depth (step 1630) then sub-column 1 is set to NULL (step 1640) and sub-column 2 is set to zero (step 1650). If, at step 1630, sub-column 1 is NULL or sub-column 2 is less than current_depth.then the subroutine goes to step 1660 to check if there are more columns.

At step 1660 the system checks if there are more columns. If there are, the system returns to step 1620. If not, the system checks if there are more rows (step 1670). If there are more rows, the system returns to step 1610. If not, the subroutine returns (step 1680).

With reference to XML file #2, as there are no rows in the column cache nothing happens yet. Furthermore, as the element is </name> the element is done.

Attribute Processing

Figure 17:
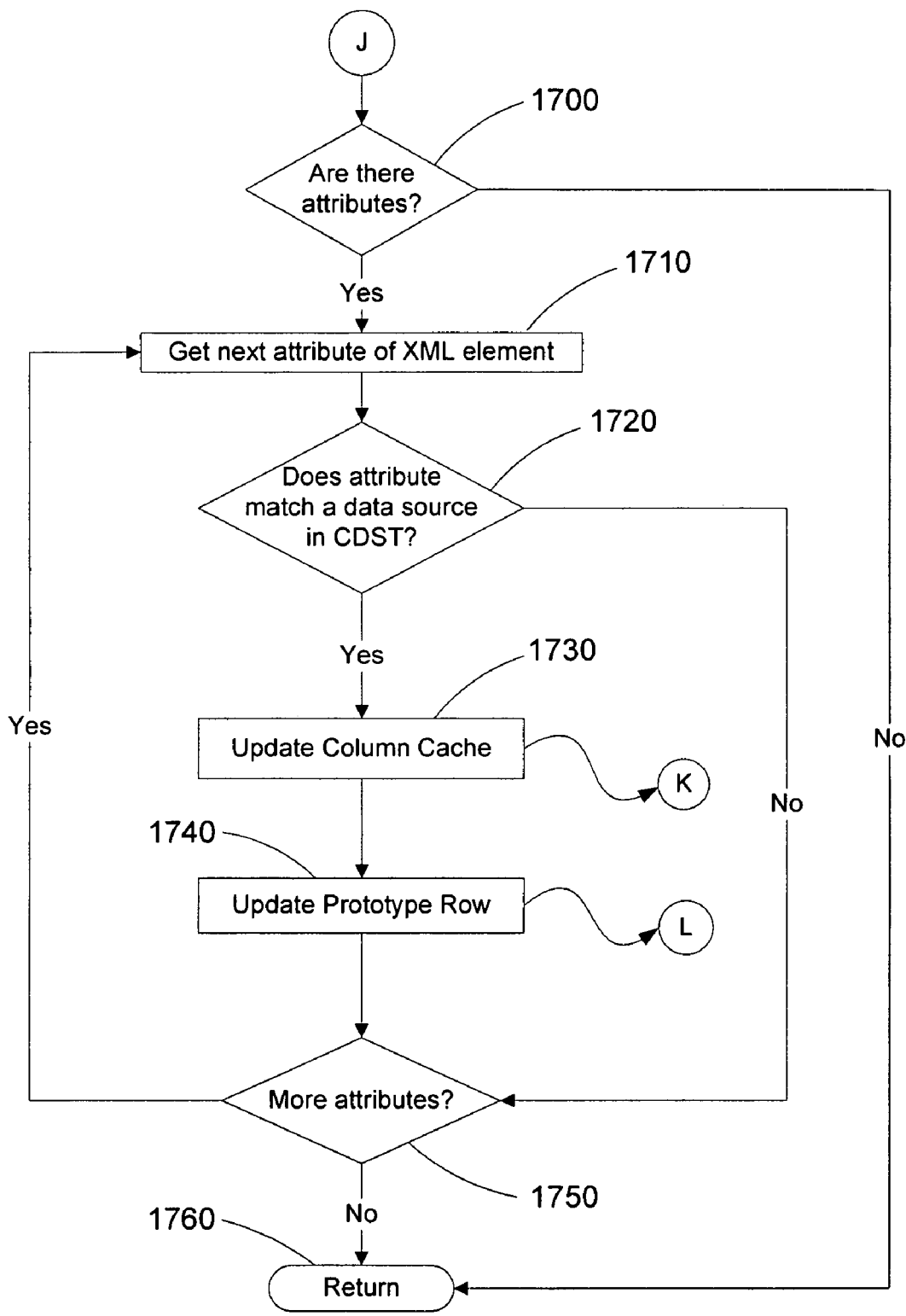
FIG. 17 is a flow chart thereof, showing the method by which attributes are processed.

As best seen in FIG. 17, a subroutine processes the attributes of each XML element. The subroutine begins by checking if there are more attributes (step 1700). If not the subroutine returns (step 1760). If there are more attributes, the next attribute is obtained (step 1710). The attribute is then compared to a data source in the CDST (step 1720). If the attribute does not match a data source, the routine checks if there are more attributes (step 1750). If the attribute matches a data source, the subroutine updates the column cache (step 1730) (as described below and with reference to FIG. 18). The subroutine then updates the prototype row (step 1740) (as described below and with reference to FIG. 19).

After these updates, the subroutine checks for more attributes in the XML element (step 1750). If there are more, the process begins again at step 1700. If there are no more attributes the subroutine returns (step 1760).

Element Processing

Figure 18:
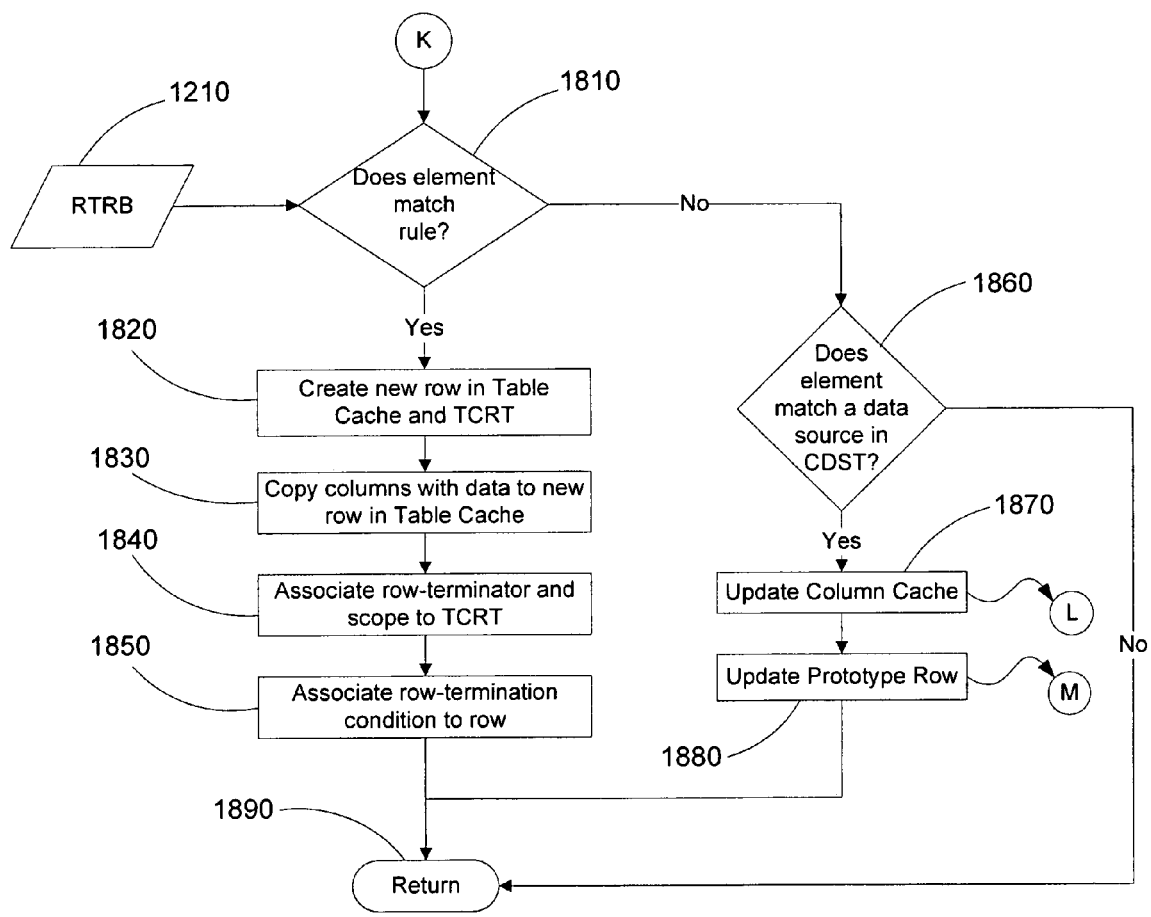
FIG. 18 is a flow chart thereof, showing the method by which elements are processed.

As seen in FIG. 18, the subroutine for processing an element begins by determining if the element matches a rule from RTRB 1210 (step 1810). If so, a new row is created in the Table Cache and TCRT (step 1820) and columns with data are copied to the new row in the Table Cache (step 1830). The row terminator and scope are associated in the TCRT (step 1840) and the row-termination condition is associated with the row (step 1850). The subroutine then returns (step 1890)

If the element does not match a rule in step 1800, the system then determines if the element matches a data source in the CDST (step 1860). If it does not, the system returns (step 1890). If it does, at step 1870, the column cache is updated as described below and with reference to FIG. 19. Then the prototype row is updated at step 1880 as described below and with reference to FIG. 20.

Update Column Cache

Figure 19:
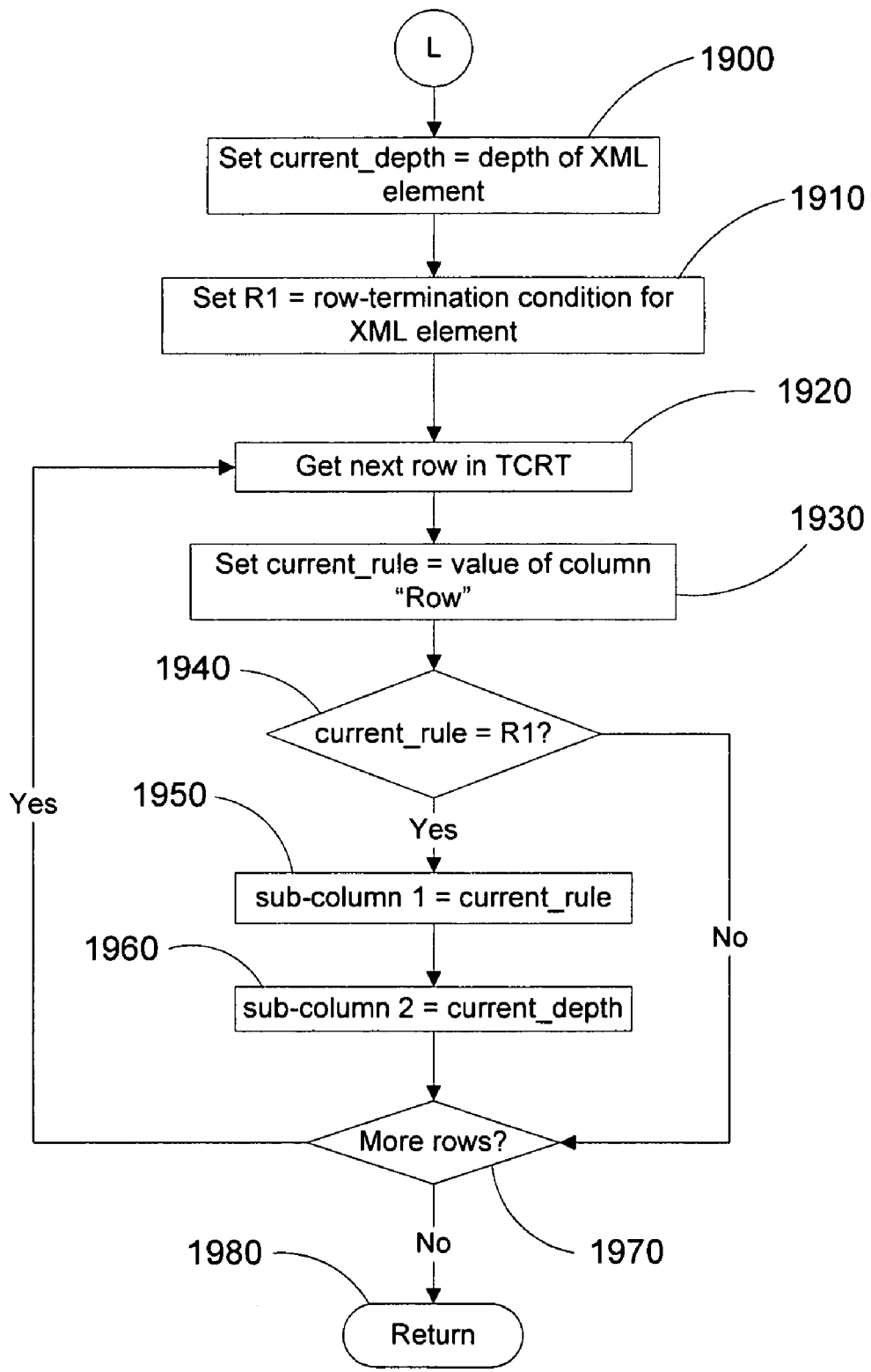
FIG. 19 is a flow chart thereof, showing the method by which the column cache is updated.

As seen in FIG. 19, the subroutine for updating the column cache begins by setting the current depth to be equal to the depth of the element (step 1900). A local, temporary variable, R1, is set to be equal to the row termination condition of that element step 1910). The next row in the TCRT is then obtained (step 1920) and the variable current_rule is set to be equal to the value of the column "Row" (step 1930).

At step 1940 the subroutine determines if the variable current_rule is equal to the variable R1. If not, the system checks if there are more rows (step 1970). If the variable current_rule is equal to R1, then sub-column 1 is set to be equal to current_rule (step 1950) and sub-column 2 is set to be equal to the variable current_depth (step 1960). The system then checks for more rows (step 1970). If there are more rows, the subroutine returns to step 1930. If not the subroutine returns (step 1980).

Update Prototype Row

Figure 20:
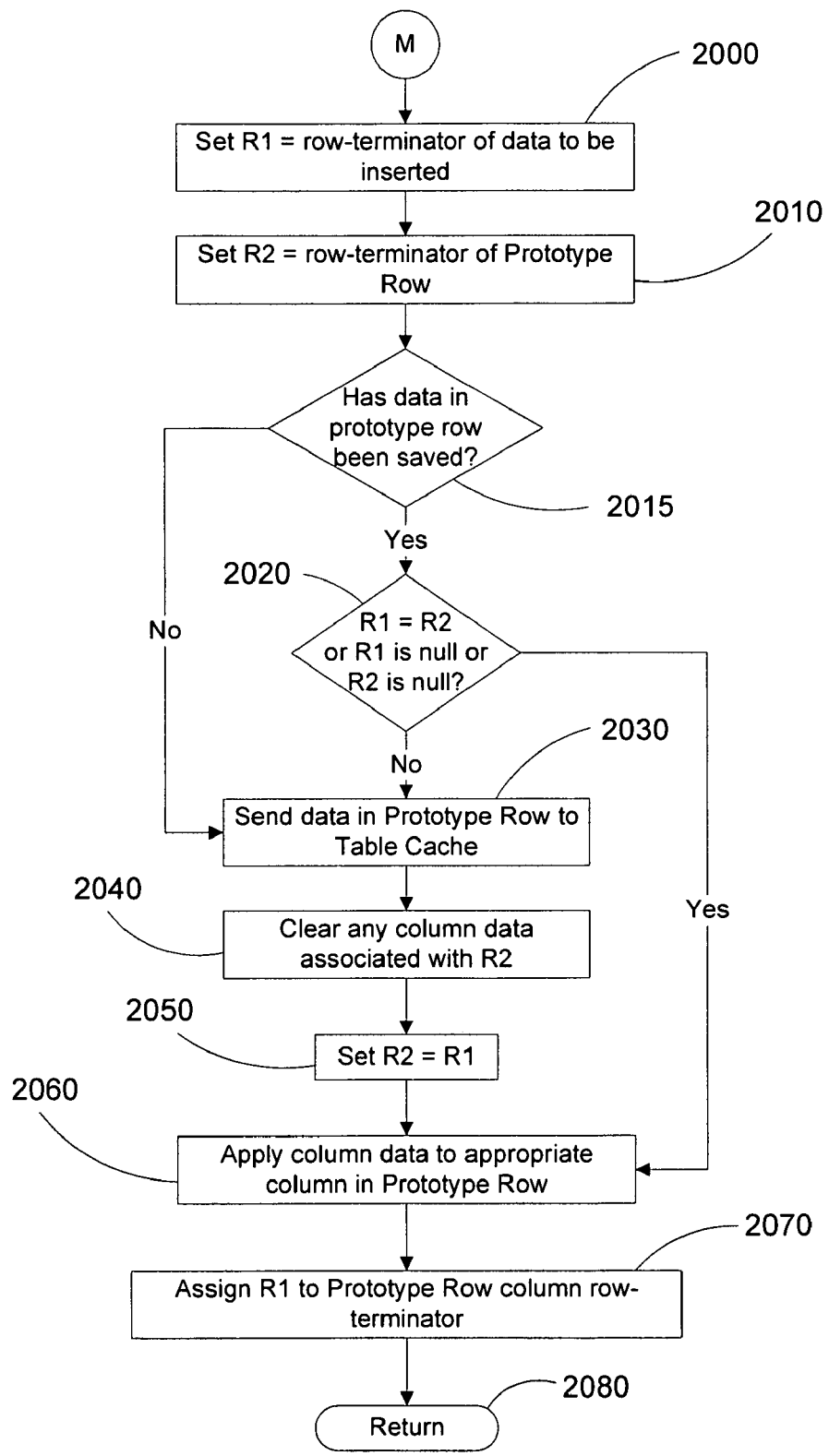
FIG. 20 is a flow chart thereof, showing the method by which the prototype row is updated.

As seen in FIG. 20, the subroutine for updating the prototype row begins by setting R1 to be equal to the row-terminator of data to be inserted (step 2000). The subroutine then sets R2 to be equal to the row-terminator of the prototype row (step 2010).

In certain circumstances, if the data being written to the prototype row would result in overwriting data that has not yet been written to the table cache (either by output of the prototype row or through backfilling cached items) then the data in the prototype row is written to the table cache, and any column data not associated with the new row-terminating condition of the data source being added is erased from the prototype row. This is accomplished by the subroutine checking if the data in the prototype row has been saved (step 2015), and if the data has not been saved sending the data in the prototype row to the table cache (step 2030). If the data has been saved the subroutine proceeds normally.

The subroutine then checks if R1 is equal to R2 or if either R1 or R2 is NULL (step 2020). If it is the subroutine skips ahead to step 2060, described below. If not, the subroutine sends the data in the prototype row to the table cache (step 2030) and clears any column data associated with R2 (step 2040).

The subroutine then sets R2 to be equal to R1 (step 2050) and applies the column data to the appropriate column in the prototype row (step 2060). R1 is then assigned to the prototype row column row-terminator (step 2070). After this, the subroutine returns (step 2080).

EXAMPLE

This example further details the processing of XML File #2 as shown in FIG. 337. It is noteworthy that this file contains column data sources that appear late in the file after certain rows have been written to the cache.

The preferred conversion of XML File #2 is to the format of Table 12.

TABLE 12

| Name | Location |
|---|---|
| Janet Smith | Administration Building |
| Tim Layne | Sanderhurst Building |
| John Dunning | Sanderhurst Building |
| Frank Tannenbaum | Sanderhurst Building |
| Sarah Dunning | Sanderhurst Building |
| Kevin Harper | Sanderhurst Building |

Table 13 shows the column data sources defined for XML File #2.

TABLE 13

| Column | Data Source |
|---|---|
| Name | /personnel/person/name/text( ) |
| | /personnel/person/team/person/name/text( ) |
| Location | /personnel/person/location/text( ) |
| | /personnel/person/team/location/text( ) |

The row-terminating conditions for these data sources are:

A: /personnel/person for
 /personnel/person/name/text( ) and
 /personnel/person/location/text( )

B: /personnel/person/team/person for
 /personnel/person/team/person/name/text( ) and
 /personnel/person/team/location/text( )

The XST, the CDST and the RTRB are shown in FIGS. 30, 31 and 32, respectively.

As the XML file is traversed, the first valid data is encountered in /personnel/person/name, and the data value ("Janet Smith") is put into the prototype row under that column as shown in Table 14.

TABLE 14

Prototype Row:

| Name | Location |
|---|---|
| Janet Smith | |

The next valid element located is <name> Tim Layne </name> which has the XPath "/personnel/person/team/person/name". Note the <title> is ignored as it is not included in the CDST). The current depth is 4 and as no element in the TCRT is greater than or equal to 4, so no action is taken. Also, as the element end is </name> it does not match an entry in the RTRB.

The element XPath does match an entry in the CDST so the update prototype row and update table cache subroutines are called. Nothing happens in the update table cache process as the prototype row is Null. In the update prototype row subroutine, the prototype row is written to the table cache and the TCRT is updated. The prototype row is then cleared and new data added to it. Table 15 shows the status of the Prototype Row, Table Cache and TCRT at this stage.

TABLE 15

/personnel/person/team/person/name in CDST
Prototype Row:

| Name | Location |
|---|---|
| Tim Layne | |

Table Cache (and Table Cache reference Table)

| Name | Location | | Name | Location | Row |
|---|---|---|---|---|---|
| Janet Smith | | | A | 2 | A |

The resulting state of the table cache is as above (note that the data under the column name: represents the row-terminating condition the data is associated with, 'A' or 'B', and the XML depth at which the data goes out of scope). While the cache holds the data, it also records the row-terminating condition (A) for the entire row, as well as the row terminating condition (A) for any columnar data written to the cache. Each columnar data also contains a scope depth (two, in the case of the Name column), which indicates the XML element hierarchy depth at which it is still valid.

The system then gets the end of this element or the next element. As </person> is found, the element is completed. The system then checks if the row terminator of this element matches that in the Prototype Row. As this is the case, a new row is created in the Table Cache and TCRT and the "name" column is cleared in the prototype row. Table 16 shows the current status of the prototype row, table cache and TCRT.

TABLE 16

Element XPath /personnel/person/team/person matches an entry in the RTRB. So we have
Prototype Row:

| Name | Location |
|---|---|
| Tim Layne | |

Table Cache (and Table Cache reference Table)

| Name | Location | | Name | Location | Row |
|---|---|---|---|---|---|
| Janet Smith | | | A | 2 | A |
| Tim Layne | | | | | B |

As "Tim Layne" came from a data source associated with the second row-terminating condition (B), the cache information is different. Note that for both rows, the Location column is still blank.

The next valid data encountered is the next /personnel/person/team/person/name ("John Dunning"). This value is first passed to the table cache to see if any backfilling is possible. In this case, it cannot, as there is no Name field associated with this row-terminating condition.

Then the value ("John Dunning") is added to the prototype row. Traversal continues until /personnel/person/team/person is exited. As this is a row-terminating condition, the prototype row is written to the cache, resulting in the state shown in Table 17.

TABLE 17

Prototype Row:

| Name | Location |
|---|---|
| John Dunning | |

Table Cache (and Table Cache reference Table)

| Name | Location |
|---|---|
| Janet Smith | |
| Tim Layne | |
| John Dunning | |

| Name | Location | | Row |
|---|---|---|---|
| A | 2 | | A |
| | | | B |
| B | 4 | | B |

Again, as the /personnel/person/team/person element is left, the current depth is passed to the cache in order to clear any references that are going out of scope. This results in the cache data just added being removed as shown in Table 18.

TABLE 18

Data

| Name | Location |
|---|---|
| Janet Smith | |
| Tim Layne | |
| John Dunning | |

Cache Info

| Name | Location | | Row |
|---|---|---|---|
| A | 2 | | A |
| | | | B |
| | | | B |

The next piece of data encountered is the element <location> Sanderhurst Building </location> having the XPath "/personnel/person/team/location". This data is sent to the cache to see if any backfilling needs to occur. In this case, there are two locations that are associated with the same row-terminating condition (B), and so the data is backfilled so the Table Cache and TCRT are as shown in Table 19.

TABLE 19

Data

| Name | Location |
|---|---|
| Janet Smith | |
| Tim Layne | Sanderhurst Building |
| John Dunning | Sanderhurst Building |

Cache Info

| Name | Location | | Row |
|---|---|---|---|
| A | 2 | | A |
| B | 3 | | B |
| B | 3 | | B |

The element /personnel/person/team/location is then exited, and the depth (4) is passed to the cache for clearing out-of-scope references. None are in this case. Then /personnel/person/team is exited, and the depth (3) is passed to the cache, which clears the two location references of that value leaving the Table Cache and TCRT as shown in Table 20.

TABLE 20

Data

| Name | Location |
|---|---|
| Janet Smith | |
| Tim Layne | Sanderhurst Building |
| John Dunning | Sanderhurst Building |

Cache Info

| Name | Location | | Row |
|---|---|---|---|
| A | 2 | | A |

The next element traversed has an XPath of "/personnel/person/location", which is a column data source associated with the row-terminating condition A. The data ("Administration Building") is first passed to the table cache to see if it can be used for backfilling, which in this case it can as shown in Table 21.

TABLE 21

Data

| Name | Location |
|---|---|
| Janet Smith | Administration Building |
| Tim Layne | Sanderhurst Building |
| John Dunning | Sanderhurst Building |

Cache Info

| Name | Location | Row |
|---|---|---|
| A | 2 | A | 2 | A |

The XML document then leaves the /personnel/person/location element. In doing so, it passes the current depth (3) to the table cache. Nothing is done, as no references were at that depth. Then /personnel/person is left, and the current depth (2) is passed to the cache. In this case, all remaining cached references have that value, and so are removed resulting in the Table Cache and TCRT as shown in Table 22.

TABLE 22

Data

| Name | Location |
|---|---|
| Janet Smith | Administration Building |
| Tim Layne | Sanderhurst Building |
| John Dunning | Sanderhurst Building |

Cache Info

| Name | Location | Row |
|---|---|---|

The remaining processing of the document is similar until the results shown in Table 12 are obtained.

Although the particular preferred embodiments of the invention have been disclosed in detail for illustrative purposes, it will be recognized that variations or modifications of the disclosed apparatus lie within the scope of the present invention.

The invention claimed is:

1. A method of converting data stored in an XML file to a table having rows and columns, the data within the XML file having a plurality of elements, each element having an XPath, the method comprising:
   (a) detecting a tabular structure for the table;
   (b) obtaining, from a user via a software wizard, an element selected by the user for addition into the tabular structure;
   (c) determining row-terminating conditions using the tabular structure of the XML file-and a plurality of column data sources, the column data sources stored in a column data source table, the determining further comprising:
   (c.1) for each of the elements, determining a number of occurrences of the element in the XML file, a number of occurrences of the element containing data, and a maximum number of occurrences of the element under a parent of the element;
   (c.2) for each of the elements, if the element contains data, adding the element to a structure description;
   (c.3) for each element in the structure description, if the element contains data and is a first element under the parent of the element, adding the element to a table like structure list; and
   (c.4) determining a rule node by:
   (i) for each column data source in the column data source table, determining if a parent of a selected node linked to the column data source is NULL, and if the parent is NULL, selecting instead a following node;
   (ii) unmarking the selected node; and
   (iii) if the parent of the selected node is unmarked, then marking the parent and replacing the selected node with the parent in the column data source table; and if the parent is marked, removing a link between the selected node and the column data source;

(d) determining a numerical scope for each of the elements in the XML file;

(e) testing one of the elements in the XML file to determine if the tested element matches one of the column data sources, and if the tested element matches one of the column data sources:
  (i) storing the element in a table cache;
  (ii) updating the columns, including items of a lesser scope within the table cache, that are within the scope of the tested element;
  (iii) storing the tested element in a prototype row; and
  (iv) when exiting the tested element, passing a depth associated with the tested element to the table cache;

(f) determining if the tested element matches one of the row-terminating conditions from a row-terminating rule base, and if the tested element matches a row-terminating condition, and the tested element is in the prototype row, then writing the prototype row to the table cache;

(g) determining if the scope of one of the column data source matches the tested element, and if so, erasing a column in the prototype row corresponding to the tested element;

(h) repeating steps (e) through (g) until each element of the XML file has been tested;

(i) copying the prototype row to the table cache; and (j) outputting the table cache as the table, wherein a column of the table has at least two of the data sources from the plurality of data sources.

2. The method of claim 1, wherein steps (e) through (g) are completed once for each of the elements.

3. The method of claim 1, wherein the row-terminating conditions are determined by:
  (c.5) examining each marked node in the structure description and copying the examined node to a row termination rule base; and
  (c.6) for each column data source in the column data source table, determining matching nodes in the row termination rule base, determining a maximum number of matching nodes and linking the column data source to a matching node having a largest maximum number of matches and updating the column data source table.

4. The method of claim 3, wherein step (d) comprises:
  (d.1) determining a data source scope table by, for each column data source in the column data source table, obtaining a row termination rule from the row termination rule base;
  (d.2) determining a scope for the column data source by determining an intersection of the column data source and the row termination rule; and
  (d.3) adding the scope to the data source scope table.

* * * * *

UNITED STATES PATENT AND TRADEMARK OFFICE
CERTIFICATE OF CORRECTION

PATENT NO. : 7,657,549 B2  Page 1 of 1
APPLICATION NO. : 11/177916
DATED : February 2, 2010
INVENTOR(S) : Morris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 185 days.

Signed and Sealed this

Thirtieth Day of November, 2010

David J. Kappos
*Director of the United States Patent and Trademark Office*